United States Patent
Arvidson et al.

(10) Patent No.: US 12,213,045 B2
(45) Date of Patent: Jan. 28, 2025

(54) PATH DISCOVERY PROCEDURE FOR A BLUETOOTH MESH NETWORK

(71) Applicant: Telefonaktiebolaget LM Ericsson (publ), Stockholm (SE)

(72) Inventors: Pontus Arvidson, Sollentuna (SE); Per Skillermark, Arsta (SE); Piergiuseppe Di Marco, Teramo (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 394 days.

(21) Appl. No.: 17/641,389

(22) PCT Filed: Sep. 9, 2019

(86) PCT No.: PCT/EP2019/074001
§ 371 (c)(1),
(2) Date: Mar. 8, 2022

(87) PCT Pub. No.: WO2021/047751
PCT Pub. Date: Mar. 18, 2021

(65) Prior Publication Data
US 2022/0303745 A1    Sep. 22, 2022

(51) Int. Cl.
*H04W 4/80* (2018.01)
*H04W 4/23* (2018.01)
*H04W 76/14* (2018.01)
*H04W 84/18* (2009.01)

(52) U.S. Cl.
CPC ............... *H04W 4/80* (2018.02); *H04W 4/23* (2018.02); *H04W 76/14* (2018.02); *H04W 84/18* (2013.01)

(58) Field of Classification Search
CPC ......... H04W 4/80; H04W 4/23; H04W 76/14; H04W 84/18; H04W 40/246
See application file for complete search history.

(56) References Cited

U.S. PATENT DOCUMENTS

2020/0305062 A1* 9/2020 Kharvar ............... H04W 36/035
2021/0022207 A1* 1/2021 Hans .................... H04W 40/02

FOREIGN PATENT DOCUMENTS

| CN | 109379770 A | * | 2/2019 | ............ H04W 36/30 |
| WO | 2018/236265 A1 | | 12/2018 | |
| WO | 2019/093937 A1 | | 5/2019 | |
| WO | 2019/098917 A1 | | 5/2019 | |
| WO | 2019/105523 A1 | | 6/2019 | |

OTHER PUBLICATIONS

Dimarco et al. (Performance Evaluation of the Data Transfer Modes in Bluetooth 5, IOT and machine-type communication, IEEE Communications Standards Magazine, Jun. 2017, pp. 92-97 (Year: 2017).*
International Search Report and Written Opinion issued in International Application No. PCT/EP2019/074001, dated Sep. 9, 2019 (15 pages).
C. Perkins et al., "Ad hoc On-Demand Distance Vector (AODV) Routing", University of California, Jul. 1, 2003 (38 pages).
Sig Proprietary Bluetooth, "Bluetooth Core Specification v5.0", Dec. 6, 2016 (Dec. 6, 2016), (pp. 1-2822).
P. Di Marco et al., "Performance Evaluation of the Data Transfer Modes in Bluetooth 5", IEEE Communictions Standards Magazine, Jun. 2017 (pp. 92-97).

* cited by examiner

*Primary Examiner* — Shailendra Kumar
(74) *Attorney, Agent, or Firm* — Rothwell, Figg, Ernst & Manbeck, P.C.

(57) ABSTRACT

A method and device for path discovery in a Bluetooth® mesh network.

15 Claims, 9 Drawing Sheets

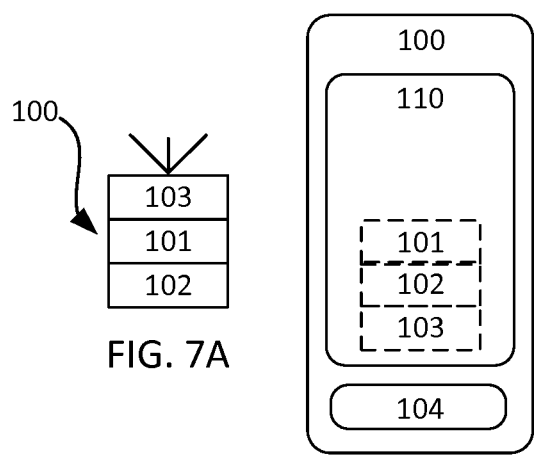
FIG. 7A
FIG. 7B
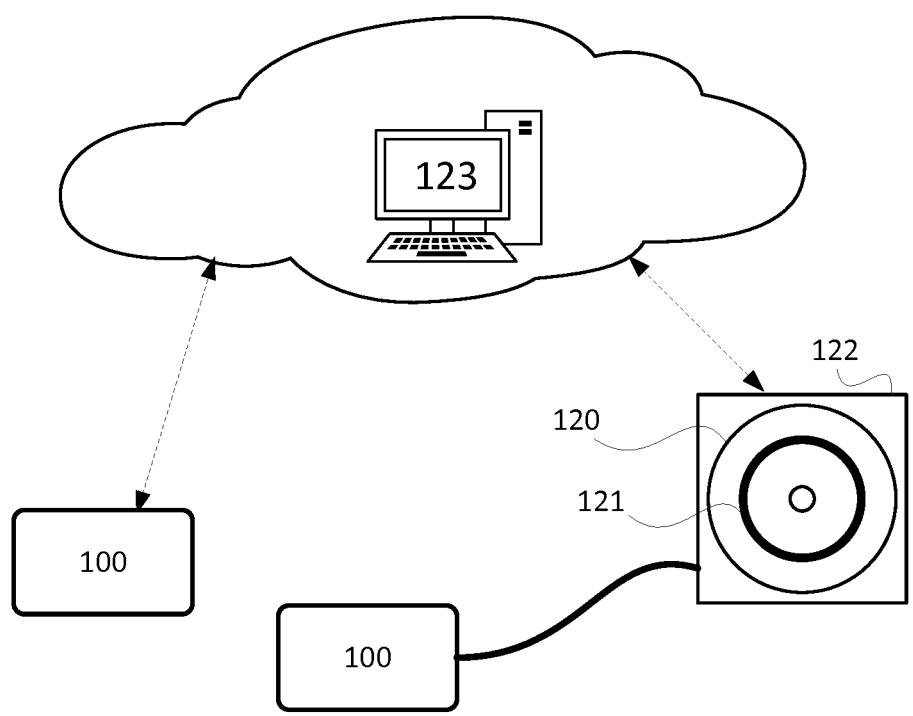
Fig. 8

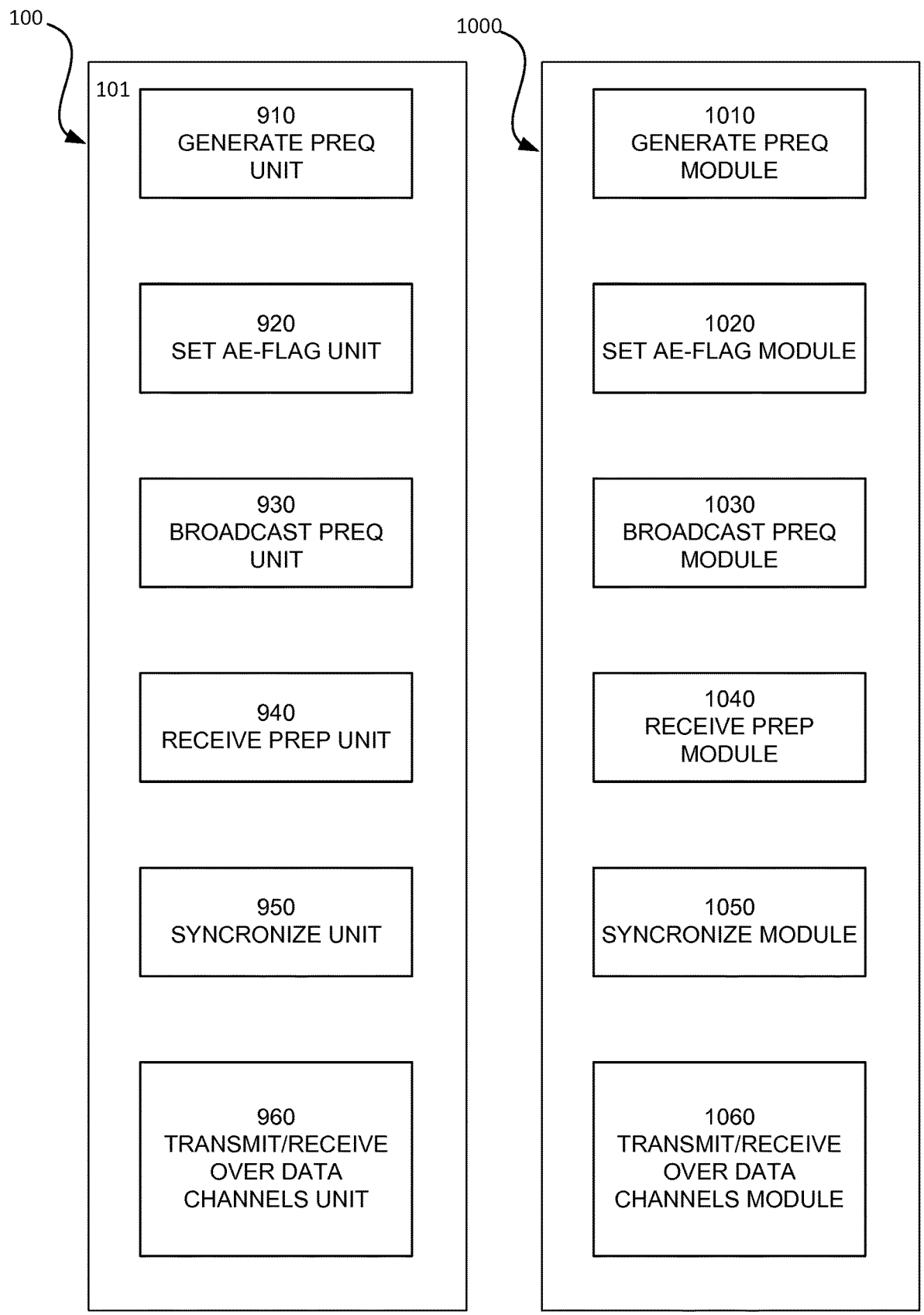

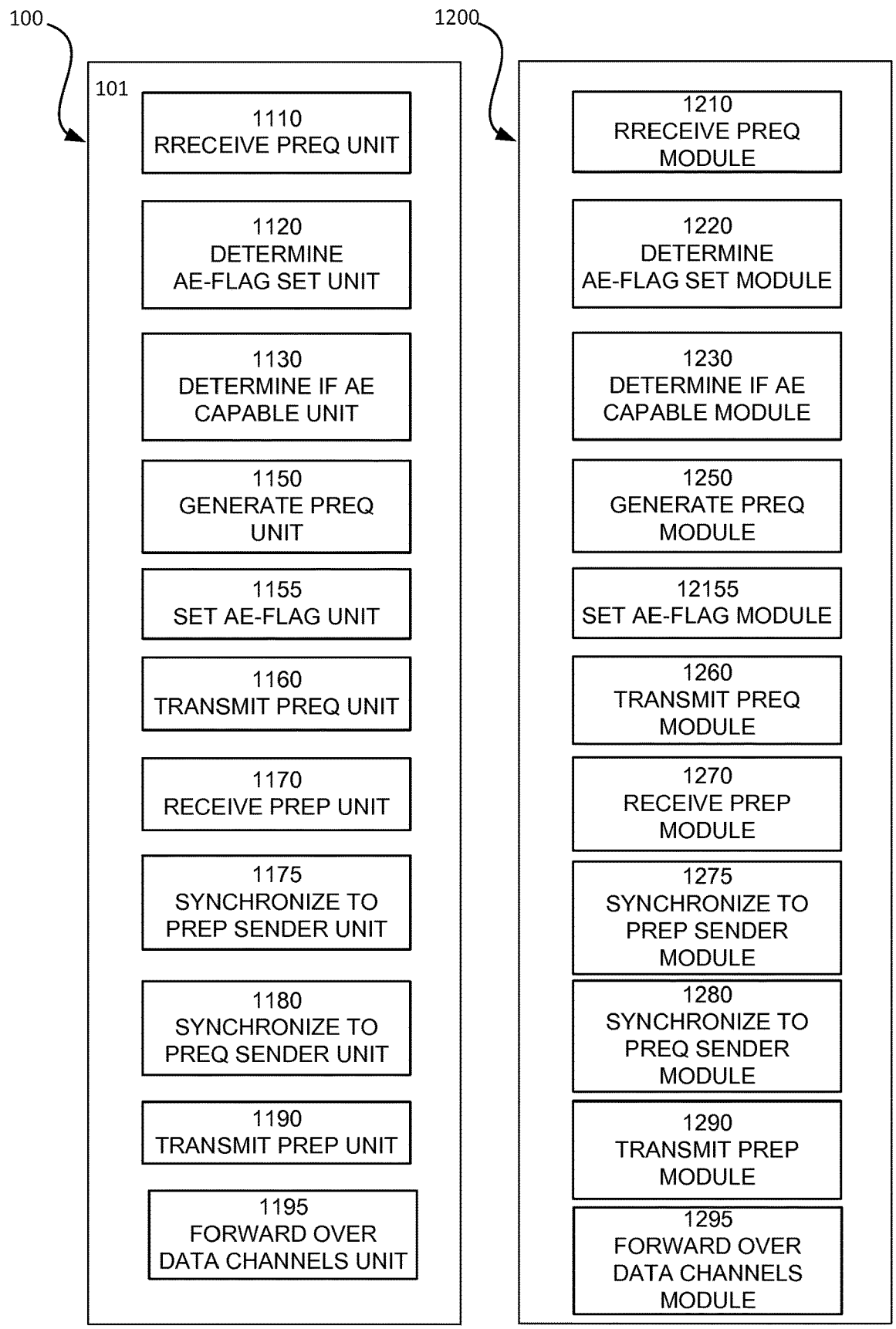

PATH DISCOVERY PROCEDURE FOR A BLUETOOTH MESH NETWORK

CROSS REFERENCE TO RELATED APPLICATION(S)

This application is a 35 U.S.C. § 371 National Stage of International Patent Application No. PCT/EP2019/074001, filed Sep. 9, 2019.

TECHNICAL FIELD

Embodiments presented herein relate to a device, a method therein, a controller, a computer program, and a computer program product. Specifically, they relate to increasing the spectrum efficiency and lowering interference, as well as increasing the message capacity.

BACKGROUND

Mesh networking is a key architecture for Internet of Things (IoT). In this network topology all nodes/devices can communicate with each other; either through direct message exchange or via intermediate nodes that help forward the message from source to destination. This is often more cost effective and easier to implement than having to use additional gateway devices or access points which often need additional equipment and more extensive planning. As stated above, a node/device may communicate with another node/device either through direct message exchange or via intermediate nodes that help forward the message from source to destination. In both cases a communication path is established between the originator node/device and the destination node/device, which path may include zero or more relay nodes/devices, one hop between each node. The originator may thus have established a communication path to the destination, even without being directly connected to the destination. This will be discussed below in more detail with reference to routing techniques.

Below follows an introduction on some terminology that is commonly used in this and related fields.

An ad hoc network is put together for a specific purpose and is often, but not always, of a temporary nature. (Ad hoc is Latin and means "for this purpose".) Ad hoc network sometimes refers to any set of networks where the nodes/devices have equal status in the network and are free to associate and/or communicate with any other node/device. Sometimes these nodes/devices are referred to as ad hoc nodes/devices.

A wireless ad hoc network is a decentralized type of wireless network were the nodes/devices communicates wirelessly. Sometimes these nodes/devices are referred to as wireless nodes/devices or wireless ad hoc nodes/devices.

The network is referred to as ad hoc because it does not rely on a preexisting infrastructure, such as base stations, access points or routers, which are normally present in managed (comprising infrastructure) wireless networks like mobile telephony networks. Instead, each node/device participates in routing by forwarding/relaying data for other nodes/devices. The determination of which nodes/devices should forward data to which other nodes/devices is made dynamically based on network connectivity.

A MANET (mobile ad hoc network) is a self-configuring infrastructure-less network of nodes/devices that are mobile and wirelessly connected. Sometimes these nodes/devices are referred to as mobile nodes/devices, wireless nodes/devices or mobile ad hoc nodes/devices. A MANET is a kind of wireless ad hoc network, but a MANET also specifically has to deal with the problems introduced by the mobility of the nodes/devices. Each node/device in a MANET is free to move independently in any direction and will therefore change its links to other devices frequently. Each device must forward traffic unrelated to its own use, and therefore act as a router. The primary challenge in building a MANET is equipping each device to continuously maintain the information required to properly route traffic. Such networks may operate by themselves or may be connected to the larger Internet.

A mesh network is a network topology in which all nodes/devices cooperate in the distribution of data, typically by each node/device forwarding/relaying data for the network. The nodes/devices in a mesh network are sometimes referred to as mesh nodes/devices.

A mesh network whose nodes/devices are all connected directly to each other is usually referred to as a fully connected mesh network. In this topology it is not necessary to use forwarding/relaying, unless for purposes like redundancy and/or load traffic load distribution.

In a partially connected mesh network, one or more nodes/devices are not connected directly to all other nodes/devices. In a partially connected mesh network forwarding/relaying of messages is necessary in order to allow all nodes/devices to reach all other nodes/devices. This is a very common network topology when the nodes/devices are wirelessly connected.

Ad hoc networks, wireless ad hoc networks and MANETs often use a mesh network topology. The nodes/devices in a mesh network does not necessarily have to be neither mobile nor wirelessly connected. Although the mesh network topology is mostly used in wireless situations, the concept is also applicable to wired networks and software interaction.

The network types, and topology, mentioned above can be designed using a routing technique or a flooding technique. Any of those techniques can incorporate multipath routing. Multipath routing is the routing technique of using multiple alternative paths through a network, which can yield a variety of benefits such as fault tolerance, increased bandwidth, or improved security. Multipath routing can also be referred to as path redundancy and path diversity.

When using a routing technique, a packet/message is propagated along a path, by hopping from node/device to node/device until the destination is reached. This is done by the having the intermediate nodes relaying/forwarding the packet/message. To ensure all its paths' availability, a mesh network must allow for continuous connections and reconfiguration around broken or blocked paths, using self-healing algorithms.

In addition to a classic routing technique, the network types can use a flooding technique for forwarding data. Flooding technique in wired networks is usually simple algorithm where every incoming packet/message is sent on every outgoing link except the one it arrived on (when having multiple links). In wirelessly connected networks, it is typically implemented by each node/device simply retransmitting (forwarding/relaying) all incoming packets/messages that are not intended for the node/device itself, in order to relay them to other nodes/devices.

A brief comparison of the two techniques using their most basic or fundamental implementations would be:

A routing technique
  generates less network traffic caused by data transmissions, since the data traffic is sent only via nodes/devices on the paths/routes that will lead to the destination nodes/devices.

generates network traffic caused by control messages and protocols setting up routes and paths and performing related tasks.

is quite reliable, since
the self-healing capabilities allow the network to continue to operate when a node/device breaks down or a connection goes bad.
A multipath routing technique is sometimes implemented. This will lead to improved behavior due to redundancy, but also to an increase in traffic load and interference.

A flooding technique
generates more network traffic caused by the data transmissions, since the data traffic is usually forwarded/relayed by all devices in the network.

generates no, or less, network traffic caused by control messages or protocols to set up routes or paths, simply since these mechanisms are not used, at least not to the same extent and with the same meaning as in a network using a routing technique.

is simple and robust as there is no need to find and setup any explicit route/path between a source node/device and a destination node/device, and messages/packets may traverse from the source node/device to the destination node/device over multiple paths/routes, providing inherent diversity against, node/device failures or bad communication.

The terminology in this field is not totally uniquely defined, people sometimes use different terminology for the same thing, or the same terminology for different things.

For the purpose of simplicity, we will use the term mesh network to denote any of the above listed network types (ad-hoc network, wireless ad hoc network and MANET) as well as any network having a mesh network topology, be it wireless or wired, with mobile or stationary nodes/devices.

In the same way we will use the terms device and node interchangeably, to denote an ad-hoc node/device, a wireless node/device, an ad-hoc wireless device, a mobile node/device, a mobile ad hoc node/device, a mesh node/device as well as other names used for devices participating in the networks mentioned above.

The term device includes devices that are only intended for or capable of participating in mesh networks, as well as devices that are intended for, or capable of, participating also in another network, as for example a mobile communications network. When it comes to the latter type of devices, one or more of the devices, or even all devices, could be simultaneously participating in the mesh network and another network. Further, a device that is designed for, or capable of, participating in another network but that for the moment is not, could temporarily or permanently have lost contact with, or for other reasons have chosen, or been ordered, not to operate in, the mobile communications network.

In the same way we will use the terms route and path interchangeably

Please note that the terms device and node in the present context denotes devices such as Machine to Machine (M2M) devices, Internet of things (IoT) devices, Device to Device (D2D) devices, relays, sensors, smartphones, mobile phones, user equipment, modems, laptops, tablet computers just to mention some examples.

The devices or nodes in the present context may be, for example, permanently or temporary mounted on equipment (containers, etc.) or a fixed structure (wall, roof, etc.), portable, pocket-storable, hand-held, computer-comprised, wearable and/or vehicle-mounted mobile devices, just to mention a few examples.

Bluetooth Mesh is an addition to the Bluetooth specifications that allows for multi-hop communication between Bluetooth devices to be able to address new use cases, mainly in the IoT area.

Bluetooth Low Energy (BLE) is a wireless personal area network technology designed by the Bluetooth Special Interest Group (SIG) aiming at novel applications in the healthcare, fitness, security, and home automation industries. Compared to Classic Bluetooth, BLE is intended to provide considerably reduced power consumption and cost while maintaining a similar communication range. On the other hand, the amount of data being transmitted by the BLE devices is much less than the classic Bluetooth devices.

The first release of the Bluetooth Mesh networking specifications was in July 2017 and uses flooding to propagate messages through the mesh network, this means that any designated relay node will relay any received message towards all other nodes within hearing distance. This version of the Bluetooth Mesh networking specifications uses the advertising bearer, as defined in version 4.0 of the Bluetooth Specification, for all transmissions. This means that out of the 40 channels used by Bluetooth, Bluetooth Mesh only uses 3.

Bluetooth mesh network is a newly adopted technology profile by Bluetooth SIG which aims at extending the coverage of the BLE network. The Bluetooth mesh network is a multi-hop network, it uses the BLE advertisement channels for data communication so that the Bluetooth mesh nodes that are within the radio range can communicate directly without establishing the data channel communication.

There is only one kind of message forwarding method considered in the Bluetooth mesh networks, namely the flooding method.

When using the flooding method, all the nodes that can act as relay nodes (also called mesh relays) participate in the message forwarding/relaying. This leads to performance and scalability issues.

There is thus a need for improving the performance and scalaility of Bluetooth Mesh networks.

SUMMARY

The inventors have realized that one possible way to improve performance and scalability of Bluetooth Mesh networks is to introduce a routing functionality similar to direct forwarding. The inventors have furthermore realized that the periodic advertisement may beneficially be utilized for providing a direct forwarding of messages. While periodic advertising is not yet utilized by Bluetooth Mesh, the inventors are proposing to use it as a bearer for future versions of Bluetooth Mesh, as it will allow for better spectrum utilization, decreased interference on the LE advertising channels, as well as vastly improved energy performance for end nodes.

Periodic Advertising (PA) was introduced to Bluetooth with the Advertising Extensions (AE) feature, which was released as part of the Bluetooth 5 specification, released in 2017. With PA, the advertiser transmits a periodic frequency hopping train of transmissions on the 37 Bluetooth Low Energy (LE) data channels. Occasionally, it will also perform beacon transmissions on the advertising channels, containing information of how which resources are used for the data channel transmissions. This allows a node that is scanning the advertising channels to discover and synchronize to the transmissions on the data channels.

When using the directed forwarding method, which is a routing technique, a path/route is created between the path originator (PO) and the path destination (PD) node(s). Only nodes that belong to the created path will act as relay nodes (also called mesh relays or routers) and forward the message.

Routing is an effective means to reduce interference in a Mesh network. With the introduction of path discovery and path management algorithms, messages can follow paths through the network, allowing only the relay nodes relevant to get the message across to perform relay transmissions. By using path discovery algorithms, a path can be established by letting a message originator flood a path request message (denoted for simplicity as PREQ) through the network. When the PREQ message is received by the message destination, the destination chooses the best path, and replies with a path reply (denoted for simplicity as PREP) message unicasted along the chosen path towards the path originator. Once the path originator receives the PREP message, the communication path is considered established through the connected relay devices along the path and will be used for subsequent data transmissions. By only allowing relay devices that are part of the path to relay messages, the congestion of the physical channels is greatly reduced leading to fewer on-air collisions and, in turn, a higher capacity of the network.

It is therefore an object of embodiments herein is to provide method and apparatuses that can be used to improve the scalability and performance of Bluetooth® Mesh Networks.

According to a first aspect there is provided a path originator Bluetooth® Mesh device comprising a controller and a communication interface configured to establish a communication path with a path destination Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of frequency channels are associated with data transfer (i.e. data transfer channels), wherein said controller is configured to:
  a) generate a Path Request message indicating the path originator Bluetooth® Mesh device as the originator of the path request message and the path destination Bluetooth Mesh Device as the path destination for the Path Request message;
  b) indicate in said Path Request message that a periodic advertising bearer on said second set of channels shall be used for subsequent mesh data messages;
  c) transmit said Path Request message over at least one of the Mesh Advertising channels;
  d) receive a Path Response message, over at least one of the Mesh Advertising channels, from a path relay Bluetooth® Mesh device, said Path Response message indicating a path to said path destination Bluetooth® Mesh device;
  e) synchronize to the path relay Bluetooth® Mesh device and
  f1) transmit a mesh data message to the path destination Bluetooth Mesh device over the periodic advertising bearer on at least one of said data transfer channels via the path relay Bluetooth® Mesh device and/or
  f2) receive a mesh data message from the path destination Bluetooth Mesh device over the periodic advertising bearer on at least one of said data transfer channels via the path relay Bluetooth® Mesh device.

According to a second aspect there is provided a path destination Bluetooth® Mesh device comprising a controller and a communication interface configured to establish a communication path with a path originator Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of channels are associated with data transfer (i.e. data transfer channels), wherein said controller is configured to:
  a) receive a Path Request message from a path relay Bluetooth® Mesh device over at least one of said plurality Mesh Advertising channels, said Path Request message indicating a path between the path originator Bluetooth® Mesh device and the Bluetooth® Mesh device;
  b) determine if said Path Request message indicates that a periodic advertising bearer on said second set of channels shall be used for subsequent mesh data messages, and if so then
  c) generate a Path Response message indicating the path between the path originator Bluetooth® Mesh device and the path destination Bluetooth® Mesh device;
  d) indicate in said Path Response message that a periodic advertising bearer on said second set of channels shall be used for subsequent mesh data messages;
  e) transmit said Path Response message to the path relay Bluetooth® Mesh device over at least one of said first set of Mesh Advertising channels;
  f) synchronize to said path relay Bluetooth® Mesh device; and
  g1) receive a message from the path originator Bluetooth® Mesh device via the path relay Bluetooth® Mesh device over at least one of said second set of data transfer channels and/or
  g2) transmit a message to the path originator Bluetooth® Mesh device via the path relay Bluetooth® Mesh device over at least one of said second set of data transfer channels.

According to a third aspect there is provided a path relay Bluetooth® Mesh device comprising a controller and a communication interface configured to synchronize to at least one second Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising (i.e. Mesh advertising channels) and a second set of channels are associated with data transfer (i.e. data transfer channels), wherein said controller is configured to:
  a) receive a Path Request message from a first one of said at least one second Bluetooth® Mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;

b) determine that said Path Request message indicates that a periodic advertising bearer on said second set of channels shall be used for subsequent mesh data messages, and in response thereto
c) determine that the path relay Bluetooth® Mesh device is capable of establishing the connection with the at least one second Bluetooth® Mesh device for establishing the communication path utilizing the Advertising Extension feature, and then
   d) generate a second Path Request message indicating the path between the path originator Bluetooth® Mesh device and the path relay Bluetooth® Mesh device, indicating the path destination Bluetooth® Mesh device;
   e) indicate in said second Path Response message that a periodic advertising bearer on said second set of channels shall be used for subsequent mesh data messages;
   f) transmit the second Path Request message to a second one of said at least one second Bluetooth® Mesh device over at least one of said first set of Mesh Advertising channels;
   g) receive a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
   h) synchronize to said first one of at least one second Bluetooth® Mesh device;
   i) synchronize to said second one of at least one second Bluetooth® Mesh device; and
   j) transmit said Path Response message to said first one of at least one second Bluetooth® Mesh device over at least one of said plurality Mesh Advertising channels; and
   k1) receive a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or
   k2) receive a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

According to a fourth aspect there is provided a Bluetooth® Mesh system comprising at least an path originator Bluetooth® Mesh device according to herein and a path destination Bluetooth® Mesh device according to herein and possibly at least one path relay Bluetooth® Mesh device according to herein.

According to a fifth aspect there is provided a computer-readable medium carrying computer instructions that when loaded into and executed by a controller of a Bluetooth mesh device enables the Bluetooth® Mesh device to implement the method according to herein.

According to a sixth aspect there is provided a method for an originator Bluetooth® Mesh device for establishing a communication path with a path destination Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of frequency channels are associated with data transfer (i.e. data transfer channels), wherein said method comprises:
   a) generating a Path Request message indicating the path originator Bluetooth® Mesh device as the originator of the path request message and the path destination Bluetooth Mesh Device as the path destination for the Path Request message;
   b) indicating in said Path Request message that a periodic advertising bearer on said second set of channels shall be used for subsequent mesh data messages;
   c) transmitting said Path Request message over at least one of the Mesh Advertising channels;
   d) receiving a Path Response message, over at least one of the Mesh Advertising channels, from a path relay Bluetooth® Mesh device, said Path Response message indicating a path to said path destination Bluetooth® Mesh device;
   e) synchronizing to the path relay Bluetooth® Mesh device and
   f1) transmitting a mesh data message to the path destination Bluetooth Mesh device over the periodic advertising bearer on at least one of said data transfer channels via the path relay Bluetooth® Mesh device and/or
   f2) receiving a message from the path destination Bluetooth Mesh device over the periodic advertising bearer on at least one of said data transfer channels via the path relay Bluetooth® Mesh device.

According to a seventh aspect there is provided a software component arrangement for an originator Bluetooth® Mesh device for establishing a communication path with a path destination Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of frequency channels are associated with data transfer (i.e. data transfer channels), wherein the software component arrangement comprises:
   a) a software component for generating a Path Request message indicating the path originator Bluetooth® Mesh device as the originator of the path request message and the path destination Bluetooth Mesh Device as the path destination for the Path Request message;
   b) a software component for indicating in said Path Request message that a periodic advertising bearer on said second set of channels shall be used for subsequent mesh data messages;
   c) a software component for transmitting said Path Request message over at least one of the Mesh Advertising channels;
   d) a software component for receiving a Path Response message, over at least one of the Mesh Advertising channels, from a path relay Bluetooth® Mesh device, said Path Response message indicating a path to said path destination Bluetooth® Mesh device;
   e) a software component for synchronizing to the path relay Bluetooth® Mesh device and f1) a software component for transmitting a mesh data message to the path destination Bluetooth Mesh device over the periodic advertising bearer on at least one of said data transfer channels via the path relay Bluetooth® Mesh device and/or f2) a software component for receiving a message from the path destination Bluetooth Mesh device over the periodic advertising bearer on at least one of said data transfer channels via the path relay Bluetooth® Mesh device.

According to an eight aspect there is provided a circuit arrangement for an originator Bluetooth® Mesh device for establishing a communication path with a path destination Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of frequency channels are associated with data transfer (i.e. data transfer channels), wherein the circuit arrangement comprises:

a) a circuit for generating a Path Request message indicating the path originator Bluetooth® Mesh device as the originator of the path request message and the path destination Bluetooth Mesh Device as the path destination for the Path Request message;

b) a circuit for indicating in said Path Request message that a periodic advertising bearer on said second set of channels shall be used for subsequent mesh data messages;

c) a circuit for transmitting said Path Request message over at least one of the Mesh Advertising channels;

d) a circuit for receiving a Path Response message, over at least one of the Mesh Advertising channels, from a path relay Bluetooth® Mesh device, said Path Response message indicating a path to said path destination Bluetooth® Mesh device;

e) a circuit for synchronizing to the path relay Bluetooth® Mesh device and f1) a circuit for transmitting a mesh data message to the path destination Bluetooth Mesh device over the periodic advertising bearer on at least one of said data transfer channels via the path relay Bluetooth® Mesh device and/or f2) a circuit for receiving a message from the path destination Bluetooth Mesh device over the periodic advertising bearer on at least one of said data transfer channels via the path relay Bluetooth® Mesh device.

According to a ninth aspect there is provided a method for a path destination Bluetooth® Mesh device for establishing a communication path with a path originator Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of channels are associated with data transfer (i.e. data transfer channels), wherein said method comprises:

a) receiving a Path Request message from a path relay Bluetooth® Mesh device over at least one of said plurality Mesh Advertising channels, said Path Request message indicating a path between the path originator Bluetooth® Mesh device and the Bluetooth® Mesh device;

b) determining if the Path Request message indicates that a periodic advertising bearer on said second set of channels shall be used for subsequent mesh data messages, and if so then c) generating a Path Response message indicating the path between the path originator Bluetooth® Mesh device and the path destination Bluetooth® Mesh device;

d) indicating in said Path Response message that a periodic advertising bearer on said second set of channels shall be used for subsequent mesh data messages;

e) transmitting said Path Response message to the path relay Bluetooth® Mesh device over at least one of said first set of Mesh Advertising channels;

f) synchronizing to said path relay Bluetooth® Mesh device; and g1) receiving a message from the path originator Bluetooth® Mesh device via the path relay Bluetooth® Mesh device over at least one of said second set of data transfer channels and/or g2) transmitting a message to the path originator Bluetooth® Mesh device via the path relay Bluetooth® Mesh device over at least one of said second set of data transfer channels.

According to a tenth aspect there is provided a software component arrangement for performing path discovery in a path destination Bluetooth® Mesh device for establishing a communication path with a path originator Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of channels are associated with data transfer (i.e. data transfer channels), wherein the software component arrangement comprises:

a) a software component for receiving a Path Request message from a path relay Bluetooth® Mesh device over at least one of said plurality Mesh Advertising channels, said Path Request message indicating a path between the path originator Bluetooth® Mesh device and the Bluetooth® Mesh device;

b) a software component for determining if the said Path Request message indicates that a periodic advertising bearer on said second set of channels shall be used for subsequent mesh data messages, and if so then c) a software component for generating a Path Response message indicating the path between the path originator Bluetooth® Mesh device and the path destination Bluetooth® Mesh device;

d) a software component for indicating in said Path Response message that a periodic advertising bearer on said second set of channels shall be used for subsequent mesh data messages;

e) a software component for transmitting said Path Response message to the path relay Bluetooth® Mesh device over at least one of said first set of Mesh Advertising channels;

f) a software component for synchronizing to said path relay Bluetooth® Mesh device; and g1) a software component for receiving a message from the path originator Bluetooth® Mesh device via the path relay Bluetooth® Mesh device over at least one of said second set of data transfer channels and/or g2) a software component for transmitting a message to the path originator Bluetooth® Mesh device via the path relay Bluetooth® Mesh device over at least one of said second set of data transfer channels.

According to an eleventh aspect there is provided a circuit arrangement for performing path discovery in a path destination Bluetooth® Mesh device for establishing a communication path with a path originator Bluetooth® Mesh device over a Bluetooth® connection utilizing the Advertising Extension feature utilizing a plurality of frequency channels of which a first set of frequency channels are associated with Mesh Advertising (i.e. Mesh advertising channels) and a second set of channels are associated with data transfer (i.e. data transfer channels), wherein the circuit arrangement comprises:

a) a circuit for receiving a Path Request message from a path relay Bluetooth® Mesh device over at least one of said plurality Mesh Advertising channels, said Path Request message indicating a path between the path originator Bluetooth® Mesh device and the Bluetooth® Mesh device;
 b) a circuit for determining if said Path Request message indicates that a periodic advertising bearer on said second set of channels shall be used for subsequent mesh data messages, and if so then
  c) a circuit for generating a Path Response message indicating the path between the path originator Bluetooth® Mesh device and the path destination Bluetooth® Mesh device;
  d) a circuit for indicating in said Path Response message that a periodic advertising bearer on said second set of channels shall be used for subsequent mesh data messages;
  e) a circuit for transmitting said Path Response message to the path relay Bluetooth® Mesh device over at least one of said first set of Mesh Advertising channels;
  f) a circuit for synchronizing to said path relay Bluetooth® Mesh device; and
  g1) a circuit for receiving a message from the path originator Bluetooth® Mesh device via the path relay Bluetooth® Mesh device over at least one of said second set of data transfer channels and/or
  g2) a circuit for transmitting a message to the path originator Bluetooth® Mesh device via the path relay Bluetooth® Mesh device over at least one of said second set of data transfer channels.

According to a twelfth aspect there is provided a method for a path relay Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising (i.e. Mesh advertising channels) and a second set of channels are associated with data transfer (i.e. data transfer channels), wherein said method comprises:

a) receiving a Path Request message from a first one of at least one second Bluetooth® mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;
 b) determining that said Path Request message indicates that a periodic advertising bearer on said second set of channels shall be used for subsequent mesh data messages, and in response thereto
 c) determining that the path relay Bluetooth® Mesh device is capable of establishing the connection with the at least one second Bluetooth® Mesh device for establishing the communication path utilizing the Advertising Extension feature, and then
 d) generating a second Path Request message indicating the path between the path originator Bluetooth® Mesh device and the path relay Bluetooth® Mesh device, indicating the path destination Bluetooth® Mesh device;
 e) indicating in said second Path Response message that a periodic advertising bearer on said second set of channels shall be used for subsequent mesh data messages;
 f) transmitting the second Path Request message to a second one of said at least one second Bluetooth® Mesh device over at least one of said first set of Mesh Advertising channels;
 g) receiving a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
 h) synchronizing to said first one of at least one second Bluetooth® Mesh device;
 i) synchronizing to said second one of at least one second Bluetooth® Mesh device; and
 j) transmitting said Path Response message to said first one of at least one second Bluetooth® Mesh device over at least one of said plurality Mesh Advertising channels; and
 k1) receiving a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or
 k2) receiving a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

According to a thirteenth aspect there is provided a software component arrangement for performing path discovery in a path relay Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising (i.e. Mesh advertising channels) and a second set of channels are associated with data transfer (i.e. data transfer channels), wherein said software component arrangement comprises:

a) a software component for receiving a Path Request message from a first one of at least one second Bluetooth® mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;
b) a software component for determining that said Path Request message indicates that a periodic advertising bearer on said second set of channels shall be used for subsequent mesh data messages, and in response thereto
c) a software component for determining that the path relay Bluetooth® Mesh device is capable of establishing the connection with the at least one second Bluetooth® Mesh device for establishing the communication path utilizing the Advertising Extension feature, and then
d) a software component for generating a second Path Request message indicating the path between the path originator Bluetooth® Mesh device and the path relay Bluetooth® Mesh device, indicating the path destination Bluetooth® Mesh device;
e) a software component for indicating in said second Path Response message that a periodic advertising bearer on said second set of channels shall be used for subsequent mesh data messages;
f) transmitting the second Path Request message to a second one of said at least one second Bluetooth® Mesh device over at least one of said first set of Mesh Advertising channels;
g) a software component for receiving a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
h) a software component for synchronizing to said first one of at least one second Bluetooth® Mesh device;
i) a software component for synchronizing to said second one of at least one second Bluetooth® Mesh device; and
j) a software component for transmitting said Path Response message to said first one of at least one second Bluetooth® Mesh device over at least one of said plurality Mesh Advertising channels; and
k1) a software component for receiving a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or
k2) a software component for receiving a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

According to a fourteenth aspect there is provided a circuit arrangement for performing path discovery in a path relay Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising (i.e. Mesh advertising channels) and a second set of channels are associated with data transfer (i.e. data transfer channels), wherein said circuit arrangement comprises:
a) a circuit for receiving a Path Request message from a first one of at least one second Bluetooth® mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;
b) a circuit for determining that said Path Request message indicates that a periodic advertising bearer on said second set of channels shall be used for subsequent mesh data messages, and in response thereto
c) a circuit for determining that the path relay Bluetooth® Mesh device is capable of establishing the connection with the at least one second Bluetooth® Mesh device for establishing the communication path utilizing the Advertising Extension feature, and then
d) a circuit for generating a second Path Request message indicating the path between the path originator Bluetooth® Mesh device and the path relay Bluetooth® Mesh device, indicating the path destination Bluetooth® Mesh device;
e) a circuit for indicating in said second Path Response message that a periodic advertising bearer on said second set of channels shall be used for subsequent mesh data messages;
f) a circuit for transmitting the second Path Request message to a second one of said at least one second Bluetooth® Mesh device over at least one of said first set of Mesh Advertising channels;
g) a circuit for receiving a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
h) a circuit for synchronizing to said first one of at least one second Bluetooth® Mesh device;
i) a circuit for synchronizing to said second one of at least one second Bluetooth® Mesh device; and
j) a circuit for transmitting said Path Response message to said first one of at least one second Bluetooth® Mesh device over at least one of said plurality Mesh Advertising channels; and
k1) a circuit for receiving a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or
k2) a circuit for receiving a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

This proposal has the main advantage that it allows for improved performance in a Bluetooth Mesh network. This is done by allowing the mesh network to utilize both the gains from utilizing the Periodic Advertising bearer, which allows for better spectrum efficiency and lowered interference, and the increased message capacity that is enabled by using path discovery.

BRIEF DESCRIPTION OF THE DRAWINGS

The inventive concept will be described, by way of example, with reference to the accompanying drawings, in which:

FIG. 7A shows a schematic view of a mesh device according to an embodiment of the teachings herein.

FIG. 7B shows a schematic view of a mesh device according to an embodiment of the teachings herein.

FIG. 8 shows a schematic view of a computer-readable medium according to an embodiment of the teachings herein.

FIG. 9 shows a schematic view of a mesh device arrangement arranged to operate as a path originator device according to an embodiment of the present invention.

FIG. 10 shows a component view for a software component (or module) arrangement according to an embodiment of the teachings herein.

FIG. 11 shows a schematic view of a mesh device arrangement arranged to operate as a path relay device according to an embodiment of the present invention.

FIG. 12 shows a component view for a software component (or module) arrangement 1200 according to an embodiment of the teachings herein.

DETAILED DESCRIPTION

Figure 1A:
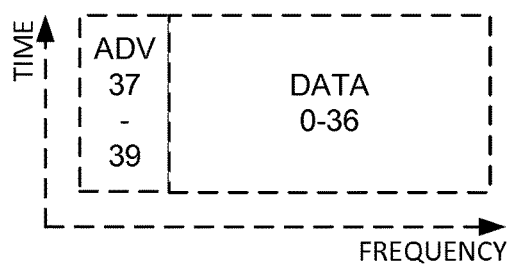
FIG. 1A shows channel distribution in BLE.

The embodiments describing methods and devices are valid for all Bluetooth® technologies which has the features and possibilities that are being discussed in this disclosure. For the sake of illustration BLE will be used as a non-limiting example.

As part of developing embodiments herein, some problems of the state of the art will first be identified and discussed.

As stated above, while periodic advertising is not yet utilized by Bluetooth Mesh, it can be one of the most likely bearers for future versions of Bluetooth Mesh, as it will allow for better spectrum utilization, decreased interference on the LE advertising channels, as well as vastly improved energy performance for end nodes. In addition, the inventors have also brilliantly realized and foreseen problems with such a solution. Using periodic advertising as the bearer for a Bluetooth mesh has some inherent problems.

The inventors have realized that if the synchronization of a periodic message train over the advertising channels is done independently of the traffic generation patterns in the network, there is a risk of some origin and destination nodes not being able to communicate with each other over periodic advertising, due to there being a limit to number of devices that a relay node can stay synchronized to. A mesh network may thus be cut off or experience severe bottlenecks if clusters of connected devices are formed where only a few devices are connected to devices outside the cluster.

Another issue that the inventors have realized is the inherent asymmetry of paths. End nodes may typically only be synchronized to one relay node in order to maintain a low duty cycle and are also not performing any periodic transmissions. Thus, the first hop of a packet, traversing the mesh network, is typically transmitted using version 4.0 advertising or regular extended advertising. In order to be able to find a bi-directional path from one node to another node in the network, it is important that the node is synchronized to the same node that is a member of the path.

Yet another issue that the inventors have realized is that there is a limit to the number of periodic advertising "trains" that a node can maintain synchronization to. The teachings herein address this in the path discovery procedure, so that a path may be found that either utilizes already synchronized links or manages to find paths around nodes that are saturated. A node that does not have enough additional capacity to synchronize to the necessary nodes to join a path is henceforth referred to as being saturated.

This invention therefore proposes a method that allows for setting up a Bluetooth mesh network using the periodic advertising bearer, while also utilizing the increased capacity that on-demand path discovery offers. This is done by setting up the paths over the 4.0 advertising bearer and only synchronizing to the periodic advertising train of a relays nodes as they are added to the path. In order to achieve this, some additional steps are necessary in the path discovery procedure.

As shown in FIG. 1A, there are forty channels defined in the BLE technology, of this plurality, a first set of channels are associated with advertisement and in the BLE 4.0 standard there are three channels in this set, in the example of FIG. 1A: ch37, ch38 and ch39. A second set of data channels are also specified, which in the BLE 4.0 standard are 37 channels, in the example of FIG. 1A: ch0-ch36. It should be noted that even though the three advertisement channels are shown as being grouped together and of lower frequency, they may be of any frequency (within the Bluetooth spectrum) and allotted separate or grouped. In the BLE 4.0 they have specified frequencies.

Figure 1B:
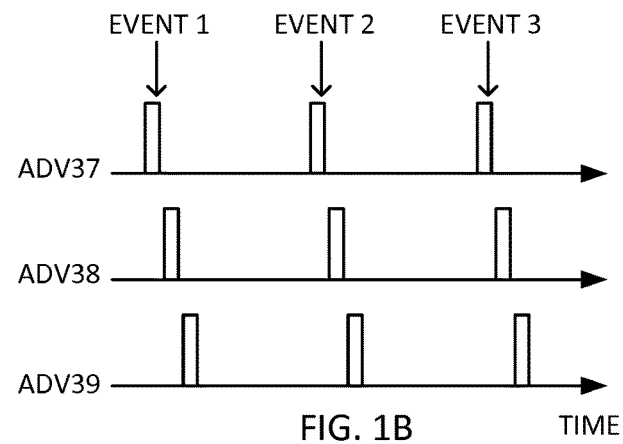
FIG. 1B shows mesh message triplet transmissions on three advertisement channels in BLE.

As shown in FIG. 1B, a Bluetooth mesh message is transmitted over all three advertisement channels within one advertisement event. There is no link layer acknowledgement mechanism defined in the mesh communication. Sometimes, the same message is retransmitted multiple times using multiple advertisement events. A Bluetooth mesh relay is a device whose radio receiver is always on. A Bluetooth mesh relay scans one advertisement channel at a time. The relay sequentially scans all the three advertisement channels.

Figure 2:
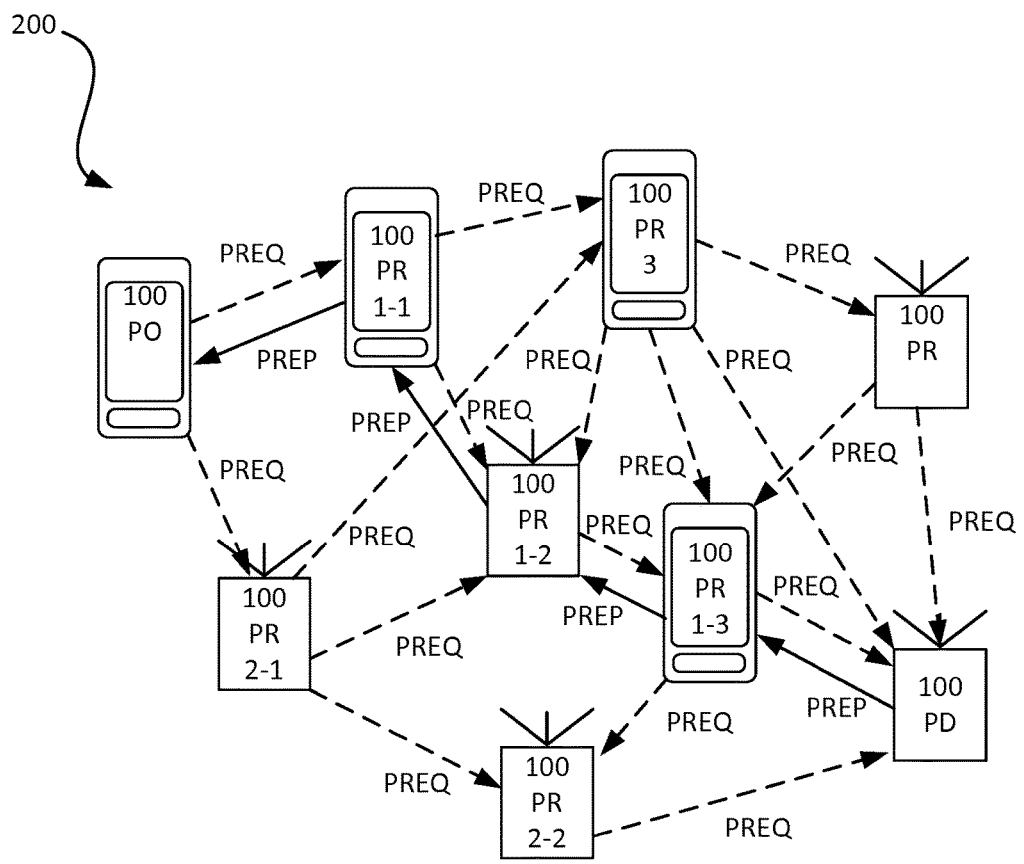
FIG. 2 shows path request propagation procedure using PREQ and path creation procedure using PREP.

In the Bluetooth mesh network of this application, the directed forwarding enabled mesh relays create paths between the path originator (PO) devices and the path destination (PD) device(s). Once a message is forwarded using directed forwarding, it is only forwarded by the relays which are included in the path established from the PO to the PD. Other nodes do not forward this message. FIG. 2 shows a general description of a general algorithm for path creation.

As shown in FIG. 2, showing a mesh network 200 comprising several Bluetooth mesh devices 100, a device 100PO, which is the Path Originator, starts the path discovery procedure by sending a path request message (PREQ, dashed arrows), intended for device 100PD, which is the Path Destination, through the whole network. The PREQ is a single-hop broadcast message. Any node or device that receives this message will generate and send a new PREQ indicating the path from the path originator to the device, by setting itself as the source of the PREQ. The PREQ message propagation continues until the PREQ is received by device 100D which is the PD.

FIG. 2 also shows the final part of the path establishment procedure between device 100PO, which is PO and device 100D, which is PD. When device 100PD, which is the PD, receives the PREQ messages, it selects the "best" relay to establish the path. Device 100PD sends a unicast path reply message (PREP, full arrows) to the relay node for the selected "best" relay. Once the selected relay device 100R receives the RREP message, it repeats the same procedure, generates and sends new PREP until the PREP reaches device 100PO which is the PO.

Before device 100PD sends PREP to device 100PR1, it has received PREQs from devices 100PR1, 100PR2, 100PR3. The PD device 100PD can select the path (or relay node) to be used based on algorithms and metrics similar to what is available in the state of the art, e.g., using a hop count based metric.

The path information is saved by each individual relay node locally in a table, which may be referred to as a forwarding table or routing table. By means of such a forwarding table, the relay node can determine if a message should be forwarded or not. The forwarding table may include information such as the path originator (PO) and the path destination (PD), such that it is possible to uniquely define and identify paths in the network.

The path request messages thus indicate the path by specifying the originator, the destination and the source node, which together with the forwarding tables discloses the path. The source node is the source for the path request message, i.e. the previous hop in the path. The nodes/devices in the mesh network utilizes the forwarding table for making decisions on whether to relay messages or not. Once a directed forwarding application-message is received by a relay, the source (SRC) and destination (DST) fields of the message are checked against the forwarding table. If the message is a unicast message, the PO and PD fields of the forwarding table are checked. If match found, the message is forwarded by the relay. Otherwise, the message is dropped. If the message is a multicast message, the SRC and DST field of the received message is checked against the PO and the subscription list field of each entry of the forwarding table. In case of a match, the received message is forwarded by the relay, otherwise, the message is dropped.

In mesh networks several methods are available to restrict the unlimited relaying of messages. One of the most important is the Time-To-Live (TTL or ttl). With this method, each message/packet includes a TTL value that limits the number of times that a message can be relayed. The message originator sets a suitable initial value for TTL. Each time a message is received and then relayed by a device, the TTL value is decremented by one. When the TTL reaches a lower threshold (e.g., 0 or 1), it will not be forwarded further. In the BLE Mesh specification, TTL=0 is used for single hop communication. Packets received with TTL=0 or TTL=1 will not be relayed.

The inventive concept will now be described more fully hereinafter with reference to the before mentioned figures, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art.

Like numbers and reference symbols refer to like elements throughout the description. Any step or feature illustrated by dashed lines in the flow diagrams should be regarded as optional. Reference will be given to both nodes and devices, and it should be clear that a node may be a device and vice-versa, a device may be a node, and the two terms should be regarded as being interchangeable for the purpose of disclosing the teachings of the invention.

The teachings herein use the legacy, or Bluetooth 4.0, advertising bearer to discover paths, and then let nodes within the network only synchronize to nodes using the periodic advertising when they are added to the paths. This is achieved by means of a number of suggested modifications to the path discovery procedure that are described herein.

The devices 100 within a mesh network 200 may be categorized as having one of three roles; path originator (PO; referenced 100PO), which is the node from which a path shall be created, an intermediate or relay device (PR; referenced 100PR) and path destination (PD; referenced 100PD), which is the device towards which a path shall be created. An end node (originator or destination in the example of FIG. 3) may transmit all its packets using the legacy advertising bearer and stay synchronized to one or more relay nodes. This allows the node to sleep when not transmitting packets or listening to an ongoing periodic advertising transmission. A relay node will always maintain a periodic advertising transmission train, in which all its outgoing data packets will be contained. It will also synchronize to a number of other relay nodes for the network to be connected. When the node is not transmitting periodic advertising, it will scan the advertising channels at all times in order to pick up messages from end nodes.

Figure 3:
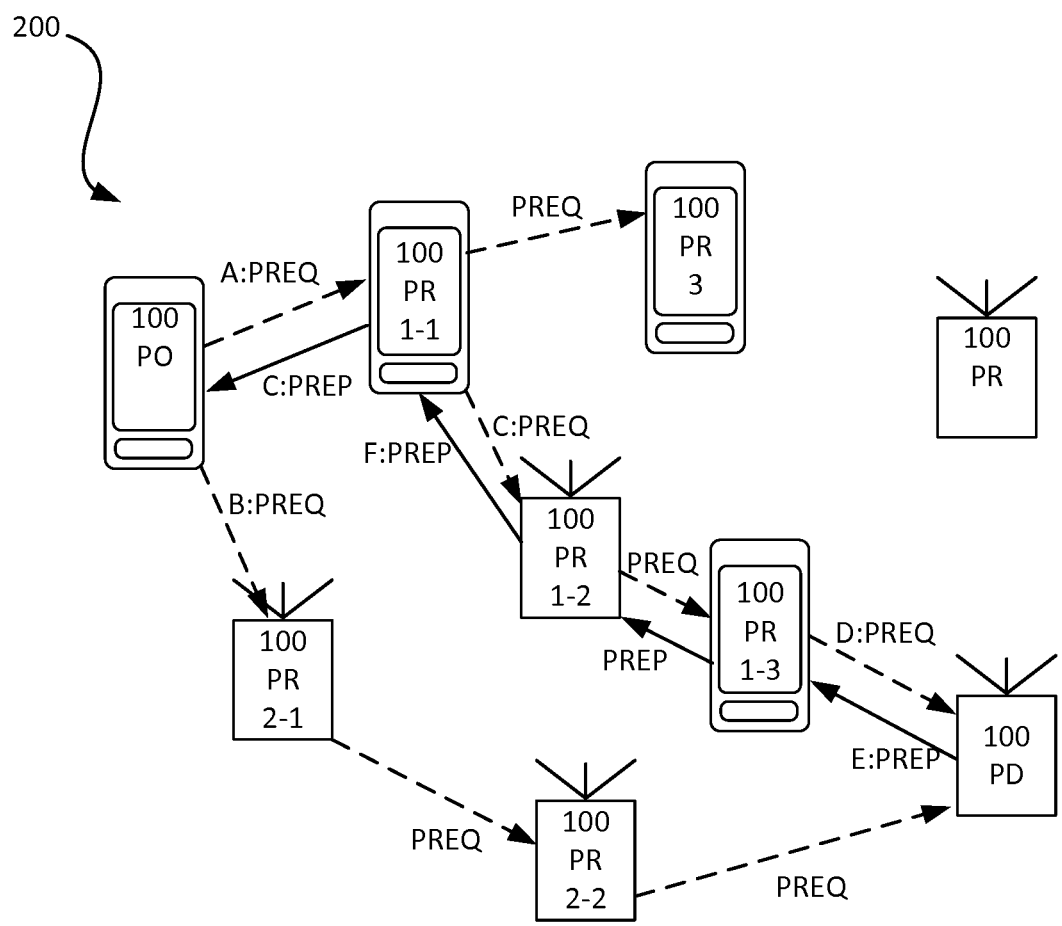
FIG. 3 shows a mesh network where path request propagation procedure using PREQ and the path creation procedure using PREP according to an embodiment of the teachings herein.

FIG. 3 shows a mesh network 200 comprising a path originator device 100PO, a path destination device 100PD, and several (seven) relay devices 100PR. The proposed solution and the modifications of the path discovery procedure will be described from the perspectives of the path originator, the path relay and the path destination giving reference to flowcharts of FIGS. 4, 5 and 6. In FIG. 3 a broadcasted message is indicated with dashed arrows and a unicasted message is indicated by full arrows.

Figure 4:
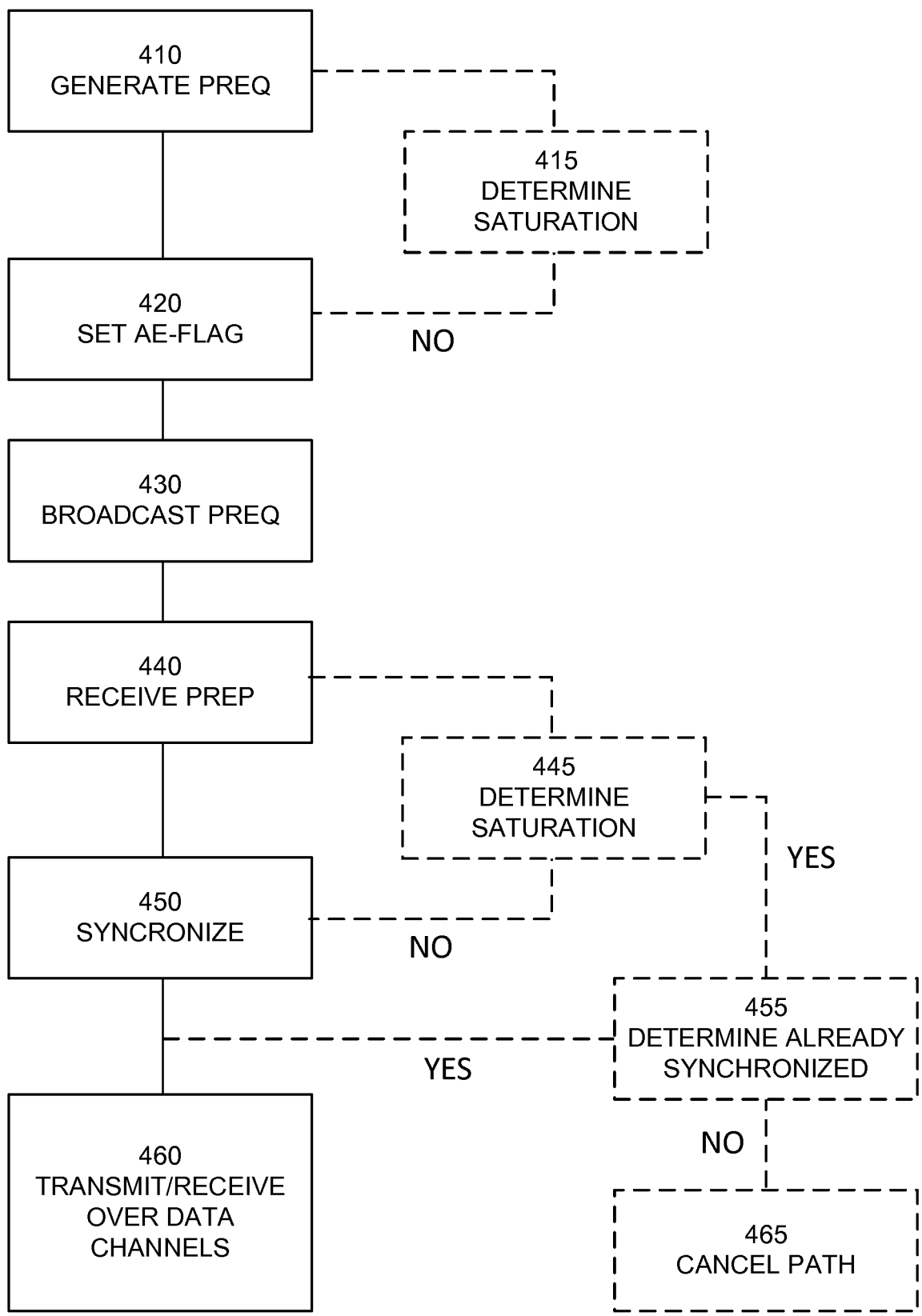
FIG. 4 shows a flowchart for a general method for a path originator device according to an embodiment of the teachings herein.

The path originator device 100PO is the node that initiates the path discovery procedure for establishing a communication path between the path originator device 100PO and the path destination device 100PD and the operation of the path originator device will be disclosed with reference to FIG. 4. FIG. 4 is a flowchart showing a general method for a path originator device according to the teachings herein. It should be noted that the path originator may be either a relay or an end node. When a path is to be discovered, the path discovery procedure is initiated in a similar way as in the state of the art disclosed giving reference to FIG. 2, but the node also indicates in the path request message (PREQ) message that the periodic advertising bearer on said second set of channels is to be used for subsequent data transmissions. In one embodiment this is done by adding a field in the PREQ, this field is henceforth referred to as the AE-Flag. The path originator device (or rather the controller of the path originator device) thus generates 410 a path request message (PREQ) indicating the path originator device as the originator of the path request message and the path destination device 100PD as the path destination. The path originator device also sets 420 an AE-flag in said Path Request message, the AE-flag indicating a capability of handling the Advertising Extension when the flag is set.

The PREQ message is transmitted by being broadcasted 430 using the 4.0 advertising bearer, i.e. at least one channel in the first set of channels, the advertising channels, to adjacent devices, probably acting as path relay devices. In FIG. 3 this is indicated by the arrows marked A:PREQ and B:PREQ indicating reception of the broadcasted PREQ message by a first path relay device 100PR1-1 (notation indicating that it is the first relay node in a first path) and a second path relay device 100PR2-1 (notation indicating that it is the first relay node in a second path).

The path originator device 100PO then waits for a path reply message (PREP) to be received 440 from a path relay device 100PR.

Figure 5:
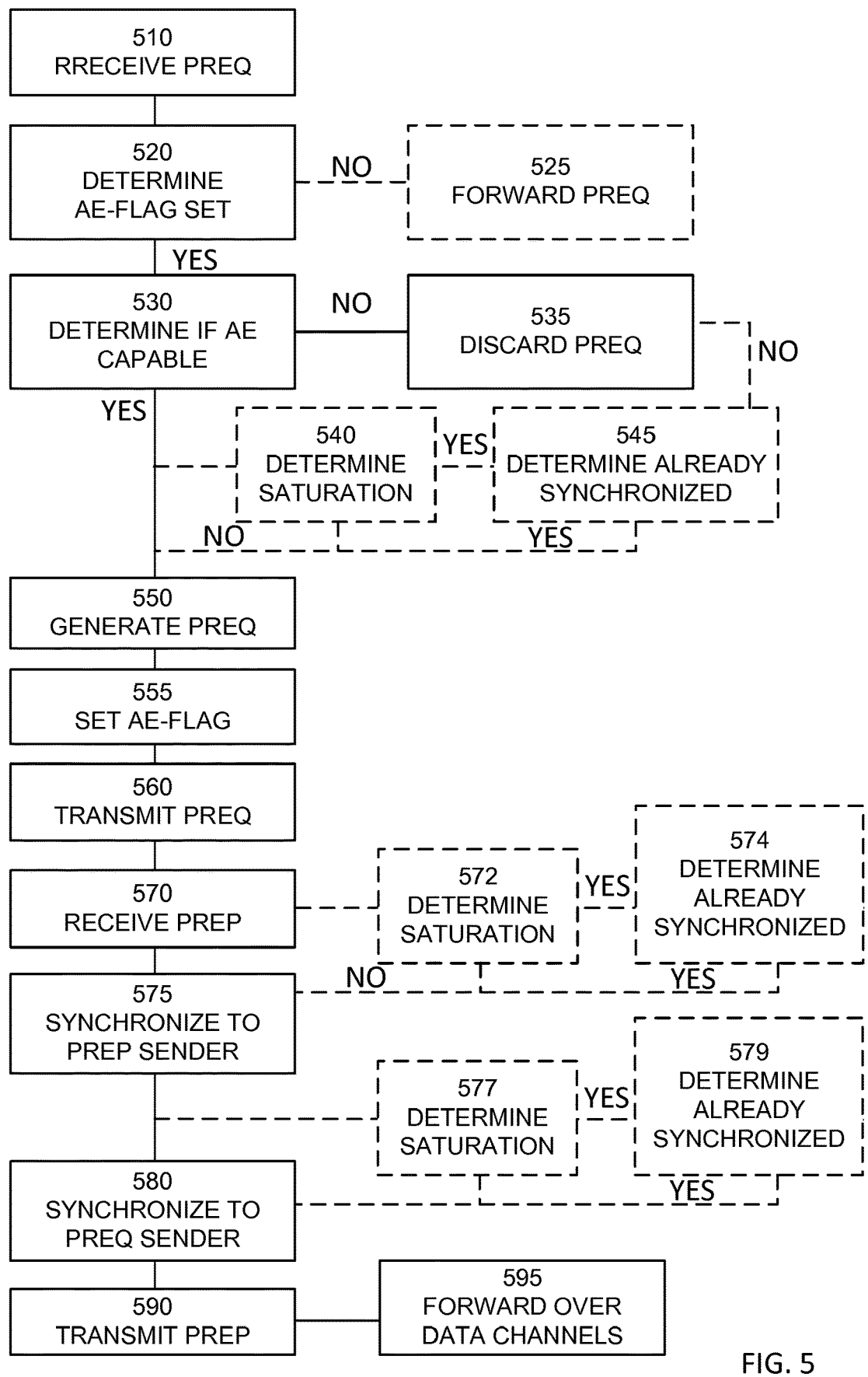
FIG. 5 shows a flowchart for a general method for a path relay device according to an embodiment of the teachings herein.

While the path originator device 100PO waits for PREP messages to be received, one or more path relay devices 100PR will have received the PREQ message. The operation of the path relay device will be disclosed with reference to FIG. 3 and FIG. 5. FIG. 5 is a flowchart for a general method for a path relay device according to the teachings herein. The path relay device 100PR is an intermediate node, located in a path between a path originator and a path destination. In the following description focus will be on the path relay device referenced 100PR1-1 (notation indicating that it is the first relay node in a first path). For the relay node, the path discovery begins upon the reception 510 of a broadcasted PREQ message. In FIG. 3, the message received is the message referenced A:PREQ. The PREQ message may be received from a path relay device. The PREQ message may alternatively be received from the path originator device 100PO. The identity of the device that the PREQ message is received from is thus dependant on where in the path the current path relay device 100PR is located. In one example the device is a path originator device 100PO, and in one example the device is another path relay device 100PR.

The path relay device 100PR then determines 520 if the AE flag is set. If the AE-flag is not set, the path relay device may forward 525 the PREQ as in the state of the art.

If the incoming PREQ has the AE-Flag set (for example set to one) it is determined 530 if the path relay device 100PR supports the Advertising Extension. If the path relay device 100PR does not support the AE feature, the PREQ message is discarded 535.

If the path relay device 100PR does support the AE feature, the PREQ message is forwarded, by the path relay device 100PR generating 450 a path request message and setting 455 an AE-flag. The path request message may be generated by copying the received PREQ message, and changing the SRC field and possibly updating the path metrics.

The path relay device 100PR then forward the PREQ message using the 4.0 advertising bearer, by transmitting it using a broadcast. In FIG. 3 this is indicated by the arrow referenced C:PREQ. As the PREQ has been transmitted, the relay node waits until a PREP message is received.

As discussed in the above, a node may be saturated. Therefore, it may, in one embodiment, be determined 540 if the node is saturated, i.e. the maximum number of nodes to be synchronized to is already reached. If it is determined that the path relay device is saturated it is determined 545 if the path relay device 100PR is already synchronized to the device that the PREQ was received from. If the path relay device is not already synchronized to the device that the PREQ was received from, the message is discarded 535.

Figure 6:
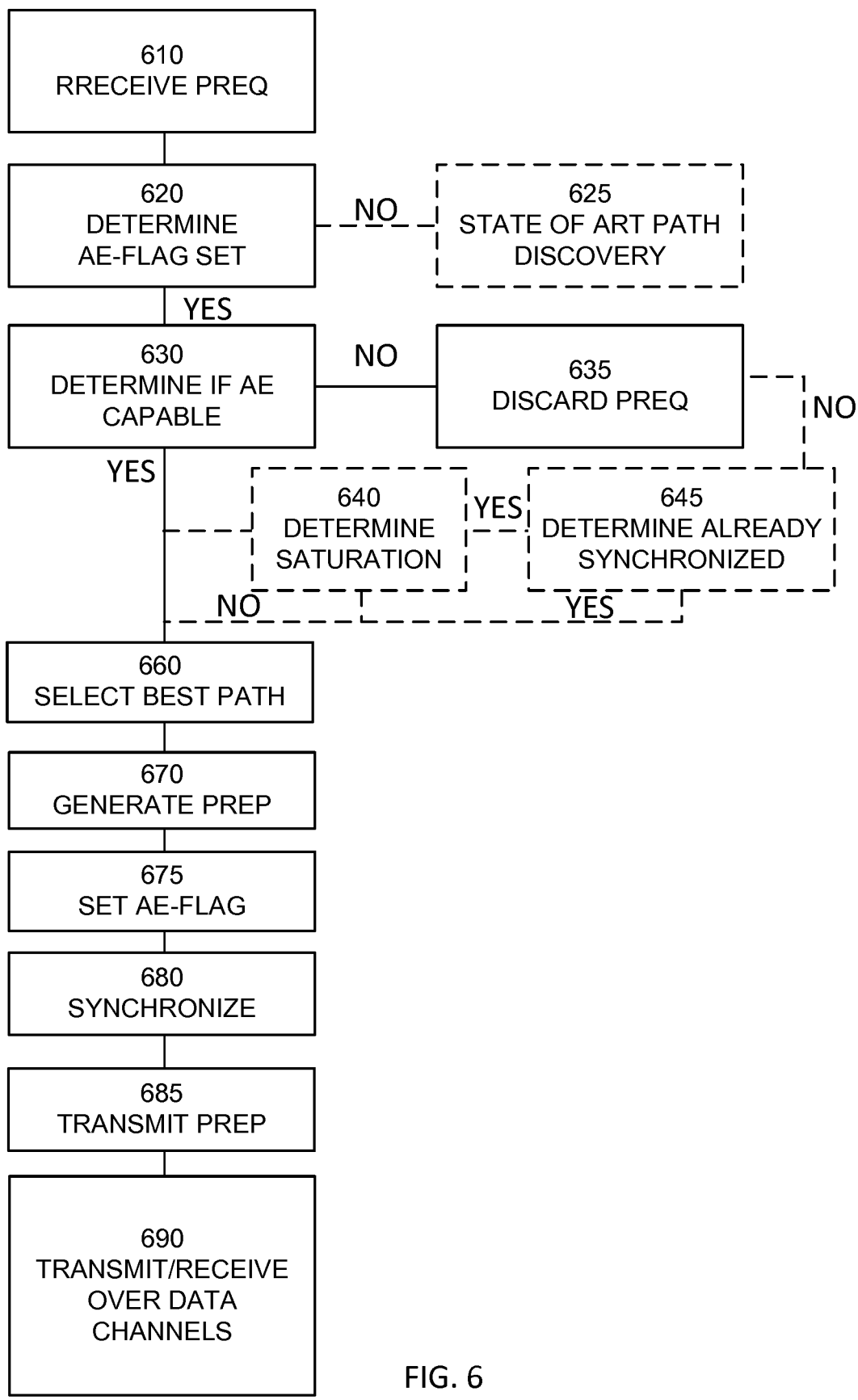
FIG. 6 shows a flowchart for a general method for a path destination device according to an embodiment of the teachings herein.

While the path relay device 100PR waits, other path relay devices 100PR may also handle and forward the PREQ. Finally the PREQ message will be received by the path destination device 100PD. The operation of the path destination device 100PD will be disclosed with reference to FIG. 6. FIG. 6 is a flowchart showing a general method for a path destination device 100PD according to the teachings herein.

The path destination device 100PD receives 610 a PREQ message (indicated by the arrow referenced D:PREQ in FIG. 3) from a path relay device 100PR in the example of FIG. 3. The PREQ message may alternatively be received from the path originator device 100PO. The identity of the device that the PREQ message is received from is thus dependant on where in the path the current path destination device 100PD is located. In one example the device is a path originator device, and in one example the device is a path relay device 100PR.

The path destination device 100PD then determines 620 if the AE flag is set. If the AE-flag is not set, the path destination device may continue path discovery 625 by responding to the PREQ as in the state of the art.

If the incoming PREQ has the AE-Flag set (for example set to one) it is determined 630 if the path destination device 100PD supports the Advertising Extension. If the path destination device 100PD does not support the AE feature, the PREQ message is discarded 635.

As discussed in the above, a node may be saturated. Therefore, it may, in one embodiment, be determined 650 if the path destination device 100PD is saturated, i.e. the maximum number of nodes to be synchronized to is already reached. If it is determined that the path destination device is saturated, it is determined 655 if the path destination device 100PD is already synchronized to the device that the PREQ was received from. If the path destination device is not already synchronized to the device that the PREQ was received from, the message is discarded 635.

When the path destination device receives a PREQ message, it may wait and gather PREQ messages from multiple paths, and then chooses 660 the best path among the candidates, i.e. the PREQ representing the best path is selected. The path destination device 100PD is thus configured to receive a first PREQ message indicating a first path, and to receive a second PREQ message indicating a second path, and to determine which of the first and the second path is the best path and select the PREQ message corresponding to the selected (best) path. The determination of which path is the best path may be based on a hop count as in the state of the art. Alternatively or additionally, the determination of which path is the best path may be based on a received signal strength or other metrics as in the state of the art.

In one embodiment, the determination of which path is the best may be based on the reception of a path cancellation message, whereby a PREQ message that is not cancelled is selected as the best path. This determination may be performed after a path has already been selected and in such an embodiment, the path destination device is configured to determine that selected PREQ message results in the selected PREQ message being discarded and select the other PREQ message for further processing.

The path destination device 100PD then generates 670 a path response message and sets an AE-flag 675. The path response message indicates the same path that the selected received path request message indicated. The path may be indicated by the message in cooperation with the forwarding tables of the devices along the path, as discussed in the above.

The path destination device 100PD synchronizes 680 to the device that the (selected) PREQ message was received from and the path response message is thereafter transmitted 685 to the device that the (selected) PREQ message was received from. In FIG. 3, this is indicated by the arrow referenced E:PREP. The PREP message is transmitted using a unicast transmission.

The path destination device may thereafter 690 receive mesh data messages from or transmit mesh data messages to the path originator device over the second set of channels, i.e. the data channels, through the periodic advertising bearer; a mesh data message being a message carrying data transmitted through the mesh network. The path destination device 100PD may receive mesh data messages from the path originator device 100PO via the selected device utilizing the transmission schedule of the selected device. The path destination device 100PD may also or alternatively transmit mesh data messages to the path originator device 100PO via the selected device utilizing the transmission schedule of the path destination device 100PD.

Returning to the path relay device and FIG. 5, the path relay device 100PR receives 570 a PREP message (indicated by the arrow referenced E:PREP) from a path relay device 100PR1-2 in the example of FIG. 3. The PREP message may alternatively be received from the path destination device 100PD. The identity of the device that the PREP message is received from is thus dependant on where in the path the current path destination device 100PD is located. In one example the device received from is a path destination device 100PD, and in one example the device is a path relay device 100PR.

The path relay device 100PR then synchronizes 575 to the device that the PREP message is received from and synchronizes 580 to the device that the corresponding PREQ message was received from.

The path relay device 100PR then forwards 590 the PREP message to the device that the corresponding PREQ message was received from. In the example of FIG. 3, this device is the path originator device 100PO.

Thereafter the path relay device 100PR may relay mesh data messages between the path originator device and the path destination device over the data channels. Mesh data messages from the path originator device to the path destination device are received from the device that the PREQ message was received from utilizing a transmission schedule of that device and forwarded to the device that the PREP message was received from utilizing the transmission schedule of the path relay device. Likewise, mesh data messages from the path destination device to the path originator device are received from the device that the PREP message was received from utilizing a transmission schedule of that device and forwarded to the device that the PREQ message was received from utilizing the transmission schedule of the path relay device.

As disclosed in the above, a node may be saturated and to handle such instances, the path relay device according to the teachings herein may, in one embodiment, be configured to determine 572 if the node is saturated, i.e. the maximum number of nodes to be synchronized to is already reached. If it is determined that the path relay device is saturated it is determined 574 if the path relay device 100PR is already synchronized to the device that the PREQ was received from. If the path relay device is not already synchronized to the device that the PREQ was received from, the PREP message is discarded and the path is cancelled. The path relay device according to the teachings herein may also, in one embodiment, be configured to determine 577 if the node is saturated, i.e. the maximum number of nodes to be synchronized to is already reached. If it is determined that the path relay device is saturated it is determined 579 if the path relay device 100PR is already synchronized to the device that the PREP was received from. If the path relay device is not already synchronized to the device that the PREP was received from, the PREP message is discarded and the path is cancelled.

Returning to the path originator device 100PO and FIG. 4, the path originator device 100PO receives a PREP message from a path relay device 100PR1-1. The identity of the path relay node 100PR is indicated by the PREP message, for example it may be indicated by the SRC field in the PREP message. In one embodiment, the PREP is transmitted to the path originator device 100PO in a unicast transmission. Upon reception of the PREP message, the path originator device 100PO synchronizes 450 to the relay node from which the PREP message was received. A path from the originator to the destination device has thereby been established for further data communication between the originator and the destination device.

The path originator device 100PO is thereby synchronized to use the transmission schedule of the path originator for transmitting mesh data messages to the path relay node, for further transmission to the path destination device 100PD. The path originator device 100PO is also synchronized to use the transmission schedule of the path relay device 100PR for receiving mesh data messages from the path relay node, for further transmission to the path destination device 100PD. The mesh data messages are transmitted and/or received 460 over the second set of channels, i.e. the data channels. In the embodiments relating to BLE technology the transmission schedule will be one aimed at frequency hopping.

It should be noted that in some cases, the path destination device 100PD will be close enough to the path originator device 100PO so that no path relay device is part of the established communication path. In such a case, the path destination device is the same path relay device that the path originator device receives the PREP message from.

As mentioned above, the number of devices that one device may be synchronized to is limited. The path originator device may thus, in one embodiment, also be configured to determine the number of devices already synchronized to prior to setting the AE-flag in the generated PREQ message and determine 415 if the path originator device is already saturated. If the path originator is already saturated, i.e. the number of synchronized devices exceeds a threshold value, the discovery process can, in one embodiment, continue as in prior art states, i.e. without setting the AE-flag. In an alternative embodiment, the PREQ message can be transmitted using a unicast message to the already synchronized path relay devices 100PR for finding a path through the already synchronized devices. If the path originator device 100PO is not already saturated, it may proceed as disclosed above.

The path originator device 100PO is, in one embodiment, also configured to determine 445 saturation prior to synchronizing to the path relay device 100PD. If it is determined that the path originator device 100PR is already saturated, it is determined 455 if the path originator device 100PO is already synchronized to the path relay device 100PR in which case, the path originator proceeds with 460 transmitting/receiving mesh data messages over the data channels. If the path originator device 100PO is not already synchronized to the path relay device 100PR, the communication path indicated by the PREP message is cancelled 465 and the PREP is discarded, thus not resulting in establishing a communication path. In one embodiment, the path originator transmits a path cancellation message to the path relay device, which message is propagated through the path, cancelling the path as discussed in relation to FIG. 6 in the above.

Returning to the path relay device 100PR, if the path relay device discards the PREP message it may perform some additional actions.

As there is no way to know before getting the PREP if a saturated node will get a path that may utilize already synchronized paths, there is a risk that all PREP messages may be discarded and that the path discovery will therefor fail. In order to ensure that subsequent path discovery attempts do not fail at the same node, the node discarding the message may add the path to a list of ignored paths and ignore subsequent discovery attempts for the same path.

The node may also, optionally, transmit a message towards the path originator, containing a notification of a failure in the path setup, allowing the originator to make a new attempt at discovering a path without having to wait for expiration of its discovery lifetime timer.

A third alternative is also that the node, discarding the PREP, sends an error message to the sender of the PREP, notifying it of discarding and allowing that node to choose another next hop node. If that node also cannot find another node, it may propagate the error message towards its next node, allowing that node to choose an alternate route. This way the error message may propagate to the path destination, where it can be decided that no path exists.

FIG. 7A shows a schematic view of a mesh device 100 according to an embodiment of the present invention. The mesh device 100 comprises a controller 101 and a memory 102. The controller 101 is configured to control the overall operation of the mesh device 100. As a skilled person would understand there are many alternatives for how to implement a controller, such as using Field-Programmable Gate Arrays circuits, AISIC, GPU, etc in addition or as an alternative. For the purpose of this application, all such possibilities and alternatives will be referred to simply as the controller 101.

The memory 102 is configured to store data and computer-readable instructions that when loaded into the controller 101 indicates how the object detection arrangement 100 is to be controlled. The memory 102 may comprise several memory units or devices, but they will be perceived as being part of the same overall memory 102. There may be one memory unit for a display arrangement storing graphics data, one memory unit for image capturing device storing settings, one memory for the communications interface (see below) for storing settings, and so on. As a skilled person would understand there are many possibilities of how to select where data should be stored and a general memory 102 for the object detection arrangement 100 is therefore seen to comprise any and all such memory units for the purpose of this application. As a skilled person would understand there are many alternatives of how to implement a memory, for example using non-volatile memory circuits, such as EEPROM memory circuits, or using volatile memory circuits, such as RAM memory circuits. For the purpose of this application all such alternatives will be referred to simply as the memory 102.

The mesh device 100 further comprises a communication interface 103. The communication interface 103 is a wireless radio-frequency interface. In one embodiment the communication interface 103 is arranged to operate according to the Bluetooth® standard. In one embodiment the communication interface 103 is arranged to operate according to the Bluetooth® Low Energy standard. The mesh device is in one embodiment arranged to operate as a path originator device 100PO according to the teachings herein. The mesh device is in one embodiment arranged to operate as a path relay device 100PR according to the teachings herein. The mesh device is in one embodiment arranged to operate as a path destination device 100PD according to the teachings herein.

FIG. 7B shows a schematic view of a mesh device 100 according to an embodiment of the present invention. In this embodiment, the mesh device 100 is a smartphone or a tablet computer. In such an embodiment, the mesh device further comprises, in addition to the components discussed with reference to FIG. 7A, a display arrangement 110, which may be a touch display, and a user interface 104.

FIG. 8 shows a schematic view of a computer-readable medium 120 carrying computer instructions 121 that when loaded into and executed by a controller of mesh device 100 enables the mesh device 100 to implement the present invention.

The computer-readable medium 120 may be tangible such as a hard drive or a flash memory, for example a USB memory stick or a cloud server. Alternatively, the computer-readable medium 120 may be intangible such as a signal carrying the computer instructions enabling the computer instructions to be downloaded through a network connection, such as an internet connection.

In the example of FIG. 8, a computer-readable medium 120 is shown as being a computer disc 120 carrying computer-readable computer instructions 121, being inserted in a computer disc reader 122. The computer disc reader 122 may be part of a cloud server 123—or other server—or the computer disc reader may be connected to a cloud server 123—or other server. The cloud server 123 may be part of the internet or at least connected to the internet. The cloud server 123 may alternatively be connected through a proprietary or dedicated connection. In one example embodiment, the computer instructions are stored at a remote server 123 and be downloaded to the memory 102 of the mesh device 100 for being executed by the controller 101.

The computer disc reader 122 may also or alternatively be connected to (or possibly inserted into) a mesh device 100 for transferring the computer-readable computer instructions 121 to a controller of the mesh device (presumably via a memory of the mesh device 100).

FIG. 8 shows both the situation when a mesh device 100 receives the computer-readable computer instructions 121 via a server connection and the situation when another mesh device 100 receives the computer-readable computer instructions 121 through a wired interface. This enables for computer-readable computer instructions 121 being downloaded into a mesh device 100 thereby enabling the mesh device 100 to operate according to and implement the invention as disclosed herein.

FIG. 9 shows a schematic view of a mesh device arrangement 100 arranged to operate as a path originator device 100PO according to an embodiment of the present invention. A circuit is to be considered to be interchangeable with a unit. The mesh device 100 comprises a controller 101 that further comprises a circuit for generating a Path Request message indicating the path originator Bluetooth® Mesh device 100, 100PO as the originator of the path request message and the path destination Bluetooth Mesh Device 100PD as the path destination for the Path Request message. The controller 101 further comprises a circuit for indicating in said Path Request message that a periodic advertising bearer on said second set of channels shall be used for subsequent mesh data messages and a circuit for transmitting said Path Request message over at least one of the Mesh Advertising channels. The controller 101 further comprises a circuit for receiving a Path Response message, over at least one of the Mesh Advertising channels, from a path relay Bluetooth® Mesh device 100, 100PR, 100PD, said Path Response message indicating a path to said path destination Bluetooth® Mesh device 100PD, a circuit for synchronizing to the path relay Bluetooth® Mesh device 100, 100PR, 100PD and a circuit for transmitting a mesh data message to the path destination Bluetooth Mesh device 100PD over the periodic advertising bearer on at least one of said data transfer channels via the path relay Bluetooth® Mesh device 100, 100PR, 100PD and/or a circuit for receiving a message from the path destination Bluetooth Mesh device 100PD over the periodic advertising bearer on at least one of said data transfer channels via the path relay Bluetooth® Mesh device 100, 100PR, 100PD.

FIG. 10 shows a component view for a software component (or module) arrangement 1000 according to an embodiment of the teachings herein. The software component arrangement 1000 is adapted to be used in a mesh device 100 as taught herein for providing path discovery.

The software component arrangement 1000 of FIG. 10 comprises a software component for a software component for generating a Path Request message indicating the path originator Bluetooth® Mesh device 100, 100PO as the originator of the path request message and the path destination Bluetooth Mesh Device 100PD as the path destination for the Path Request message. The software component arrangement further comprises a software component for indicating in said Path Request message that a periodic advertising bearer on said second set of channels shall be used for subsequent mesh data messages and a software component for transmitting said Path Request message over at least one of the Mesh Advertising channels. The software component arrangement further comprises a software component for receiving a Path Response message, over at least one of the Mesh Advertising channels, from a path relay Bluetooth® Mesh device 100, 100PR, 100PD, said Path Response message indicating a path to said path destination Bluetooth® Mesh device 100PD, a software component for synchronizing to the path relay Bluetooth® Mesh device 100, 100PR, 100PD and a software component for transmitting a mesh data message to the path destination Bluetooth Mesh device 100PD over the periodic advertising bearer on at least one of said data transfer channels via the path relay Bluetooth® Mesh device 100, 100PR, 100PD and/or a software component for receiving a message from the path destination Bluetooth Mesh device 100PD over the periodic advertising bearer on at least one of said data transfer channels via the path relay Bluetooth® Mesh device 100, 100PR, 100PD.

FIG. 11 shows a schematic view of a mesh device arrangement 100 arranged to operate as a path relay device 100PR according to an embodiment of the present invention. A circuit is to be considered to be interchangeable with a unit. The mesh device 100 comprises a controller 101 that further comprises a circuit for receiving a Path Request message from a first one of at least one second Bluetooth® mesh device 100, 100PR, 100PO over at least one of said first set of Mesh Advertising channels, said Path Request message requesting the path between the path originator Bluetooth® Mesh device 100PO and the path destination Bluetooth® Mesh device 100, 100PD, and indicating a path between the path originator Bluetooth® Mesh device 100, 100PD and the path relay Bluetooth® Mesh device 100, 100R and a circuit for determining that said Path Request message indicates that a periodic advertising bearer on said second set of channels shall be used for subsequent mesh data messages, and a circuit for determining in response thereto that the path relay Bluetooth® Mesh device 100, 100PR is capable of establishing the connection with the at least one second Bluetooth® Mesh device 100, 100PR, 100PD, 100PO for establishing the communication path utilizing the Advertising Extension feature. The controller 101 further comprises a circuit for generating a second Path Request message indicating the path between the path originator Bluetooth® Mesh device 100PO and the path relay Bluetooth® Mesh device 100, 100PR, indicating the path destination Bluetooth® Mesh device 100, 100PD, a circuit for indicating in said second Path Response message that a periodic advertising bearer on said second set of channels shall be used for subsequent mesh data messages, a circuit for transmitting the second Path Request message to a second one of said at least one second Bluetooth® Mesh device 100, 100PR, 100PD over at least one of said first set of Mesh Advertising channels. The controller 101 further comprises a circuit for receiving a Path Response message from the second one of said at least one second Bluetooth® Mesh device 100, 100PR, 100PD over at least one of said first set of Mesh Advertising channels, the Path Response message indicating a path between the path originator Bluetooth® Mesh device 100, 100PO and the path destination Bluetooth® Mesh device 100, 100PD. The controller 101 further comprises a circuit for synchronizing to said first one of at least one second Bluetooth® Mesh device 100, 100PR, 100PO, a circuit for synchronizing to said second one of at least one second Bluetooth® Mesh device 100, 100PR, 100PD, and a circuit for transmitting said Path Response message to said first one of at least one second Bluetooth® Mesh device 100, 100PR, 100PO over at least one of said plurality Mesh Advertising channels, and a circuit for receiving a mesh data message from the path originator Bluetooth® Mesh device 100, 100PO to the path destination Bluetooth® Mesh device 100, 100PD from the first one of at least one second Bluetooth® Mesh device 100, 100PR, 100PO over at least one of said second set of data transfer channels and forward the message from the path originator Bluetooth® Mesh device 100, 100PO to the path destination Bluetooth® Mesh device 100, 100PD to the second one of at least one second Bluetooth® Mesh device 100, 100PR, 100PD, and/or a circuit for receiving a mesh data message from the path destination Bluetooth® Mesh device 100, 100PR, 100PD to the path originator Bluetooth® Mesh device 100, 100PR, 100PO via the second one of at least one second Bluetooth® Mesh device 100, 100PR, 100PD over at least one of said second set of data transfer channels and forward the message from the path destination Bluetooth® Mesh device 100, 100PD to the path originator Bluetooth® Mesh device 100, 100PO to the first one of at least one second Bluetooth® Mesh device 100, 100PR, 100.0.

FIG. 12 shows a component view for a software component (or module) arrangement 1200 according to an embodiment of the teachings herein. The software component arrangement 1200 is adapted to be used in a mesh device 100 as taught herein for providing path discovery.

The software component arrangement 1200 of FIG. 12 comprises a software component for receiving a Path Request message from a first one of at least one second Bluetooth® mesh device 100, 100PR, 100PO over at least one of said first set of Mesh Advertising channels, said Path Request message requesting the path between the path originator Bluetooth® Mesh device 100PO and the path destination Bluetooth® Mesh device 100, 100PD, and indicating a path between the path originator Bluetooth® Mesh device 100, 100PD and the path relay Bluetooth® Mesh device 100, 100R and a software component for determining that said Path Request message indicates that a periodic advertising bearer on said second set of channels shall be used for subsequent mesh data messages, and a software component for determining in response thereto that the path relay Bluetooth® Mesh device 100, 100PR is capable of establishing the connection with the at least one second Bluetooth® Mesh device 100, 100PR, 100PD, 100PO for establishing the communication path utilizing the Advertising Extension feature. The software component arrangement further comprises a software component for generating a second Path Request message indicating the path between the path originator Bluetooth® Mesh device 100PO and the path relay Bluetooth® Mesh device 100, 100PR, indicating the path destination Bluetooth® Mesh device 100, 100PD, a software component for indicating in said second Path Response message that a periodic advertising bearer on said second set of channels shall be used for subsequent mesh data messages, a software component for transmitting the second Path Request message to a second one of said at least one second Bluetooth® Mesh device 100, 100PR, 100PD over at least one of said first set of Mesh Advertising channels. The software component arrangement further comprises a software component for receiving a Path Response message from the second one of said at least one second Bluetooth® Mesh device 100, 100PR, 100PD over at least one of said first set of Mesh Advertising channels, the Path Response message indicating a path between the path originator Bluetooth® Mesh device 100, 100PO and the path destination Bluetooth® Mesh device 100, 100PD. The software component arrangement further comprises a software component for synchronizing to said first one of at least one second Bluetooth® Mesh device 100, 100PR, 100PO, a software component for synchronizing to said second one of at least one second Bluetooth® Mesh device 100, 100PR, 100PD, and a software component for transmitting said Path Response message to said first one of at least one second Bluetooth® Mesh device 100, 100PR, 100PO over at least one of said plurality Mesh Advertising channels, and a software component for receiving a mesh data message from the path originator Bluetooth® Mesh device 100, 100PO to the path destination Bluetooth® Mesh device 100, 100PD from the first one of at least one second Bluetooth® Mesh device 100, 100PR, 100PO over at least one of said second set of data transfer channels and forward the message from the path originator Bluetooth® Mesh device 100, 100PO to the path destination Bluetooth® Mesh device 100, 100PD to the second one of at least one second Bluetooth® Mesh device 100, 100PR, 100PD, and/or a software component for receiving a mesh data message from the path destination Bluetooth® Mesh device 100, 100PR, 100PD to the path originator Bluetooth® Mesh device 100, 100PR, 100PO via the second one of at least one second Bluetooth® Mesh device 100, 100PR, 100PD over at least one of said second set of data transfer channels and forward the message from the path destination Bluetooth® Mesh device 100, 100PD to the path originator Bluetooth® Mesh device 100, 100PO to the first one of at least one second Bluetooth® Mesh device 100, 100PR, 100.0.

Figures 13, 14:
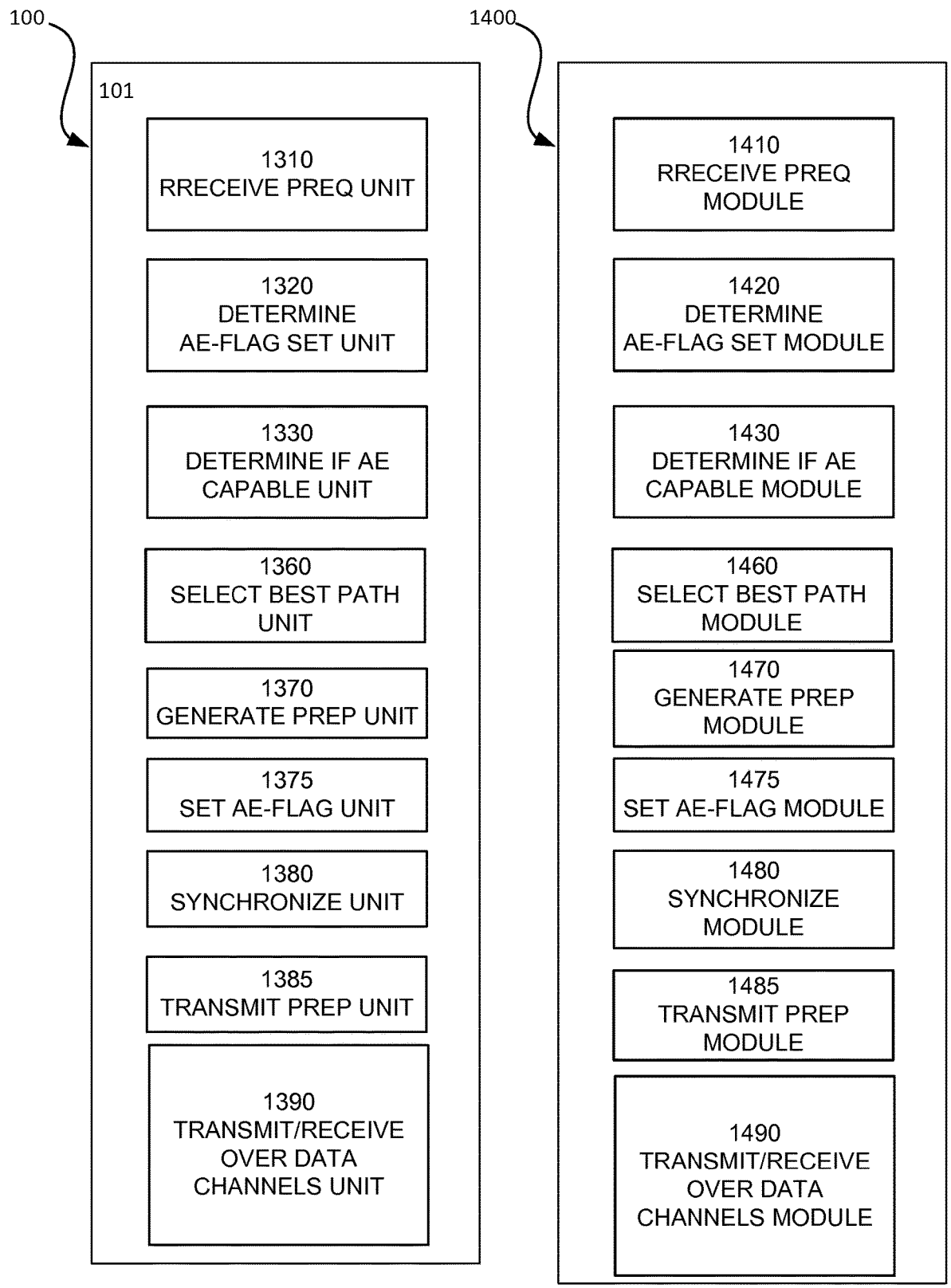
FIG. 13 shows a schematic view of a mesh device arrangement arranged to operate as a path destination device according to an embodiment of the present invention.
FIG. 14 shows a component view for a software component (or module) arrangement according to an embodiment of the teachings herein.

FIG. 13 shows a schematic view of a mesh device arrangement 100 arranged to operate as a path destination device 100PD according to an embodiment of the present invention. A circuit is to be considered to be interchangeable with a unit. The mesh device 100 comprises a controller 101 that further comprises a circuit for receiving a Path Request message from a path relay Bluetooth® Mesh device 100, 100PR, over at least one of said plurality Mesh Advertising channels, said Path Request message indicating a path between the path originator Bluetooth® Mesh device 100PO and the Bluetooth® Mesh device 100, 100PD and a circuit for determining if said Path Request message indicates that a periodic advertising bearer on said second set of channels shall be used for subsequent mesh data messages, and if so then a circuit for generating a Path Response message indicating the path between the path originator Bluetooth® Mesh device 100PO and the path destination Bluetooth® Mesh device 100, 100PD and a circuit for indicating in said Path Response message that a periodic advertising bearer on said second set of channels shall be used for subsequent mesh data messages. The controller 101 further comprises a circuit for transmitting said Path Response message to the path relay Bluetooth® Mesh device 100, 100PR, over at least one of said first set of Mesh Advertising channels, a circuit for synchronizing to said path relay Bluetooth® Mesh device 100, 100PR, and a circuit for receiving a message from the path originator Bluetooth® Mesh device 100, 100PO via the path relay Bluetooth® Mesh device 100, 100PR over at least one of said second set of data transfer channels and/or a circuit for transmitting a message to the path originator Bluetooth® Mesh device 100, 100PR, 100PO via the path relay Bluetooth® Mesh device 100, 100PR over at least one of said second set of data transfer channels.

FIG. 14 shows a component view for a software component (or module) arrangement 1400 according to an embodiment of the teachings herein. The software component arrangement 1400 is adapted to be used in a mesh device 100 as taught herein for providing path discovery.

The software component arrangement 1400 of FIG. 14 comprises a software component for receiving a Path Request message from a path relay Bluetooth® Mesh device 100, 100PR, over at least one of said plurality Mesh Advertising channels, said Path Request message indicating a path between the path originator Bluetooth® Mesh device 100PO and the Bluetooth® Mesh device 100, 100PD and a software component for determining if said Path Request message indicates that a periodic advertising bearer on said second set of channels shall be used for subsequent mesh data messages, and if so then a software component for generating a Path Response message indicating the path between the path originator Bluetooth® Mesh device 100PO and the path destination Bluetooth® Mesh device 100, 100PD and a software component for indicating in said Path Response message that a periodic advertising bearer on said second set of channels shall be used for subsequent mesh data messages. The software component arrangement further comprises a software component for transmitting said Path Response message to the path relay Bluetooth® Mesh device 100, 100PR, over at least one of said first set of Mesh Advertising channels, a software component for synchronizing to said path relay Bluetooth® Mesh device 100, 100PR, and a software component for receiving a message from the path originator Bluetooth® Mesh device 100, 100PO via the path relay Bluetooth® Mesh device 100, 100PR over at least one of said second set of data transfer channels and/or a software component for transmitting a message to the path originator Bluetooth® Mesh device 100, 100PR, 100PO via the path relay Bluetooth® Mesh device 100, 100PR over at least one of said second set of data transfer channels.

The blocks in the circuits or units diagrams of FIGS. 9, 11 and 13, may refer to a combination of analog and digital circuits, and/or one or more controller units, configured with software and/or firmware, e.g. stored in the storage units (data base), that when executed by the one or more controller units perform as described above. One or more of these controller units, as well as any other combination of analog and digital circuits, may be included in a single application-specific integrated circuitry (ASIC), or several controller units and various digital hardware may be distributed among several separate components, whether individually packaged or assembled into a system-on-a-chip (SoC). The one or more controller units may be any one of, or a combination of a central processing unit (CPU), graphical processing unit (GPU), programmable logic array (PAL) or any other similar type of circuit or logical arrangement.

The embodiments herein may be implemented through combination of analog and digital circuits, and one or more controller units, together with computer program code for performing the functions and actions of the embodiments herein. The program code mentioned above may also be provided as a computer program product, for instance in the form of a data carrier carrying computer program code for performing the embodiments herein when being loaded into the mobile communications device. One such carrier may be in the form of a CD ROM disc. It is however feasible with other data carriers such as a memory stick. The computer program code may furthermore be provided as pure program code on a server and downloaded to the mobile communications device at production, and/or during software updates.

When using the word "comprise" or "comprising" it shall be interpreted as non-limiting, i.e. meaning "consist at least of".

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A path originator Bluetooth® Mesh device comprising a controller and a communication interface configured to establish a communication path with a path destination Bluetooth® Mesh device over a Bluetooth® connection utilizing the Advertising Extension feature utilizing a plurality of frequency channels of which a first set of frequency channels are associated with Mesh Advertising and a second set of frequency channels are associated with data transfer, wherein said controller is configured to:
    a) generate a Path Request message indicating the path originator Bluetooth® Mesh device as the originator of the path request message and the path destination Bluetooth Mesh Device as the path destination for the Path Request message;
    b) indicate in said Path Request message that a periodic advertising bearer on said second set of channels shall be used for subsequent mesh data messages;
    c) transmit said Path Request message over at least one of the Mesh Advertising channels;
    d) receive a Path Response message, over at least one of the Mesh Advertising channels, from a path relay Bluetooth® Mesh device, said Path Response message indicating a path to said path destination Bluetooth® Mesh device;
    e) synchronize to the path relay Bluetooth® Mesh device and
    f1) transmit a mesh data message to the path destination Bluetooth Mesh device over the periodic advertising bearer on at least one of said data transfer channels via the path relay Bluetooth® Mesh device and/or
    f2) receive a mesh data message from the path destination Bluetooth Mesh device over the periodic advertising bearer on at least one of said data transfer channels via the path relay Bluetooth® Mesh device.

2. The path originator Bluetooth® Mesh device of claim 1, wherein the controller is further configured to
    d1) receive the Path Response message from the path relay Bluetooth® Mesh device through a unicast transmission.

3. The path originator Bluetooth® Mesh device of claim 1, wherein the controller is further configured to f2) transmit a message to the path destination Bluetooth Mesh device over the periodic advertising bearer on at least one of said data transfer channels by utilizing a transmission schedule of the path originator Bluetooth® Mesh device.

4. The path originator Bluetooth® Mesh device of claim 3, wherein the transmission schedule is based on frequency hopping.

5. The path originator Bluetooth® Mesh device of claim 1, wherein the controller is further configured to f2) receive a message from the path destination Bluetooth Mesh device over the periodic advertising bearer on at least one of said data transfer channels by utilizing a transmission schedule of the path relay Bluetooth® Mesh device.

6. The path originator Bluetooth® Mesh device of claim 1, wherein the controller is further configured to:
    prior to b) indicating in said Path Request message that a periodic advertising bearer on said second set of channels shall be used for subsequent mesh data messages:
        determine a number of path relay Bluetooth® Mesh devices that the path originator Bluetooth® Mesh device is synchronized to; and
        determine whether the number is below a saturation threshold, wherein step b) is performed as a result of determining that the determined number is below the saturation threshold.

7. The path originator Bluetooth® Mesh device of claim 1, wherein the path relay Bluetooth® Mesh device is the path destination Bluetooth® Mesh device.

8. A path destination Bluetooth® Mesh device comprising a controller and a communication interface configured to establish a communication path with a path originator Bluetooth® Mesh device, over a Bluetooth® connection utilizing the Advertising Extension feature utilizing a plurality of frequency channels of which a first set of frequency channels are associated with Mesh Advertising and a second set of channels are associated with data transfer, wherein said controller is configured to:
- a) receive a Path Request message from a path relay Bluetooth® Mesh device over at least one of said plurality Mesh Advertising channels, said Path Request message indicating a path between the path originator Bluetooth® Mesh device and the Bluetooth® Mesh device;
- b) determine if said Path Request message indicates that a periodic advertising bearer on said second set of channels shall be used for subsequent mesh data messages, and if so then
- c) generate a Path Response message indicating the path between the path originator Bluetooth® Mesh device and the path destination Bluetooth® Mesh device;
- d) indicate in said Path Response message that a periodic advertising bearer on said second set of channels shall be used for subsequent mesh data messages;
- e) transmit said Path Response message to the path relay Bluetooth® Mesh device over at least one of said first set of Mesh Advertising channels;
- f) synchronize to said path relay Bluetooth® Mesh device; and
- g1) receive a message from the path originator Bluetooth® Mesh device via the path relay Bluetooth® Mesh device over at least one of said second set of data transfer channels and/or
- g2) transmit a message to the path originator Bluetooth® Mesh device via the path relay Bluetooth® Mesh device over at least one of said second set of data transfer channels.

9. The path destination Bluetooth® Mesh device according to of claim 8, wherein the controller is further configured to
- e1) transmit said Path Response message to the one of said at least one second Bluetooth® Mesh device over at least one of said first set of Mesh Advertising channels utilizing a unicast transmission.

10. A path relay Bluetooth® Mesh device comprising a controller and a communication interface configured to synchronize to at least one second Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising and a second set of channels are associated with data transfer, wherein said controller is configured to:
- a) receive a Path Request message from a first one of said at least one second Bluetooth® Mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;
- b) determine that said Path Request message indicates that a periodic advertising bearer on said second set of channels shall be used for subsequent mesh data messages, and in response thereto
- c) determine that the path relay Bluetooth® Mesh device is capable of establishing the connection with the at least one second Bluetooth® Mesh device for establishing the communication path utilizing the Advertising Extension feature, and then
- d) generate a second Path Request message indicating the path between the path originator Bluetooth® Mesh device and the path relay Bluetooth® Mesh device, indicating the path destination Bluetooth® Mesh device;
- e) indicate in said second Path Response message that a periodic advertising bearer on said second set of channels shall be used for subsequent mesh data messages;
- f) transmit the second Path Request message to a second one of said at least one second Bluetooth® Mesh device over at least one of said first set of Mesh Advertising channels;
- g) receive a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
- h) synchronize to said first one of at least one second Bluetooth® Mesh device;
- i) synchronize to said second one of at least one second Bluetooth® Mesh device; and
- j) transmit said Path Response message to said first one of at least one second Bluetooth® Mesh device over at least one of said plurality Mesh Advertising channels; and
- k1) receive a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or
- k2) receive a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

11. The path relay Bluetooth® Mesh device of claim 10, wherein the controller is further configured to
- g) receive the Path Response message from the second one of said at least one second Bluetooth® Mesh device over at least one of said first set of Mesh Advertising channels through a unicast transmission, and
- j) transmit said Path Response message to said first one of at least one second Bluetooth® Mesh device over at least one of said first set of Mesh Advertising channels through a unicast transmission.

12. The Bluetooth® Mesh device of claim 10, wherein the plurality of frequency channels are 40, of which the first set associated with Mesh Advertising includes 3 frequency channels and the second set are associated with data transfer includes 37 channels.

13. A method for an originator Bluetooth® Mesh device for establishing a communication path with a path destination Bluetooth® Mesh device over a Bluetooth® connection utilizing the Advertising Extension feature utilizing a plurality of frequency channels of which a first set of frequency channels are associated with Mesh Advertising and a second set of frequency channels are associated with data transfer, wherein said method comprises:
 a) generating a Path Request message indicating the path originator Bluetooth® Mesh device as the originator of the path request message and the path destination Bluetooth Mesh Device as the path destination for the Path Request message;
 b) indicating in said Path Request message that a periodic advertising bearer on said second set of channels shall be used for subsequent mesh data messages;
 c) transmitting said Path Request message over at least one of the Mesh Advertising channels;
 d) receiving a Path Response message, over at least one of the Mesh Advertising channels, from a path relay Bluetooth® Mesh device, said Path Response message indicating a path to said path destination Bluetooth® Mesh device;
 e) synchronizing to the path relay Bluetooth® Mesh device and
 f1) transmitting a mesh data message to the path destination Bluetooth Mesh device over the periodic advertising bearer on at least one of said data transfer channels via the path relay Bluetooth® Mesh device and/or
 f2) receiving a mesh data message from the path destination Bluetooth Mesh device over the periodic advertising bearer on at least one of said data transfer channels via the path relay Bluetooth® Mesh device.

14. A method for a path destination Bluetooth® Mesh device for establishing a communication path with a path originator Bluetooth® Mesh device-, over a Bluetooth® connection utilizing the Advertising Extension feature utilizing a plurality of frequency channels of which a first set of frequency channels are associated with Mesh Advertising and a second set of channels are associated with data transfer, wherein said method comprises:
 a) receiving a Path Request message from a path relay Bluetooth® Mesh device over at least one of said plurality Mesh Advertising channels, said Path Request message indicating a path between the path originator Bluetooth® Mesh device and the Bluetooth® Mesh device;
 b) determining if the Path Request message indicates that a periodic advertising bearer on said second set of channels shall be used for subsequent mesh data messages, and if so then
 c) generating a Path Response message indicating the path between the path originator Bluetooth® Mesh device and the path destination Bluetooth® Mesh device;
 d) indicating in said Path Response message that a periodic advertising bearer on said second set of channels shall be used for subsequent mesh data messages;
 e) transmitting said Path Response message to the path relay Bluetooth® Mesh device over at least one of said first set of Mesh Advertising channels;
 f) synchronizing to said path relay Bluetooth® Mesh device; and
 g1) receiving a message from the path originator Bluetooth® Mesh device via the path relay Bluetooth® Mesh device over at least one of said second set of data transfer channels and/or
 g2) transmitting a message to the path originator Bluetooth® Mesh device via the path relay Bluetooth® Mesh device over at least one of said second set of data transfer channels.

15. A method for a path relay Bluetooth® Mesh device for establishing a communication path between a path originator Bluetooth® Mesh device and a path destination Bluetooth® Mesh device over a Bluetooth® connection utilizing the Advertising Extension feature utilizing a plurality of frequency channels of which a first set frequency channels are associated with Mesh Advertising and a second set of channels are associated with data transfer, wherein said method comprises:
 a) receiving a Path Request message from a first one of at least one second Bluetooth® mesh device over at least one of said first set of Mesh Advertising channels, said Path Request message requesting the path between the path originator Bluetooth® Mesh device and the path destination Bluetooth® Mesh device, and indicating a path between the path originator Bluetooth® Mesh device and the path relay Bluetooth® Mesh device;
 b) determining that said Path Request message indicates that a periodic advertising bearer on said second set of channels shall be used for subsequent mesh data messages, and in response thereto
 c) determining that the path relay Bluetooth® Mesh device is capable of establishing the connection with the at least one second Bluetooth® Mesh device for establishing the communication path utilizing the Advertising Extension feature, and then
 d) generating a second Path Request message indicating the path between the path originator Bluetooth® Mesh device and the path relay Bluetooth® Mesh device, indicating the path destination Bluetooth® Mesh device;
 e) indicating in said second Path Response message that a periodic advertising bearer on said second set of channels shall be used for subsequent mesh data messages;
 f) transmitting the second Path Request message to a second one of said at least one second Bluetooth® Mesh device over at least one of said first set of Mesh Advertising channels;
 g) receiving a Path Response message from the second one of said at least one second Bluetooth® Mesh device over at least one of said first set of Mesh Advertising channels, the Path Response message indicating a path between the path originator Bluetooth® Mesh device and the path destination Bluetooth® Mesh device;
 h) synchronizing to said first one of at least one second Bluetooth® Mesh device;
 i) synchronizing to said second one of at least one second Bluetooth® Mesh device; and
 j) transmitting said Path Response message to said first one of at least one second Bluetooth® Mesh device over at least one of said plurality Mesh Advertising channels; and
 k1) receiving a mesh data message from the path originator Bluetooth® Mesh device to the path destination Bluetooth® Mesh device from the first one of at least one second Bluetooth® Mesh device over at least one of said second set of data transfer channels and forward the message from the path originator Bluetooth® Mesh device to the path destination Bluetooth® Mesh device to the second one of at least one second Bluetooth® Mesh device; and/or k2) receiving a mesh data message from the path destination Bluetooth® Mesh device to the path originator Bluetooth® Mesh device via the second one of at least one second Bluetooth® Mesh device over at least one of said second set of data transfer channels and forward the message from the path destination Bluetooth® Mesh device to the path originator Bluetooth® Mesh device to the first one of at least one second Bluetooth® Mesh device.

\* \* \* \* \*